(12) United States Patent
Nissilä et al.

(10) Patent No.: US 12,449,707 B2
(45) Date of Patent: Oct. 21, 2025

(54) OPTICAL ARBITRARY PULSE PATTERN GENERATOR

(71) Applicant: Teknologian tutkimuskeskus VTT Oy, Espoo (FI)

(72) Inventors: Jaani Nissilä, Espoo (FI); Mikko Merimaa, Espoo (FI); Kari Ojasalo, Espoo (FI); Thomas Fordell, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 383 days.

(21) Appl. No.: 18/001,952

(22) PCT Filed: Jun. 16, 2021

(86) PCT No.: PCT/FI2021/050454
§ 371 (c)(1),
(2) Date: Dec. 15, 2022

(87) PCT Pub. No.: WO2021/255342
PCT Pub. Date: Dec. 23, 2021

(65) Prior Publication Data
US 2023/0221613 A1 Jul. 13, 2023

(30) Foreign Application Priority Data
Jun. 16, 2020 (FI) .................................. 20205637

(51) Int. Cl.
*G02F 1/225* (2006.01)
*G02F 1/01* (2006.01)
*G02F 1/21* (2006.01)

(52) U.S. Cl.
CPC .......... *G02F 1/2252* (2013.01); *G02F 1/0121* (2013.01); *G02F 1/0136* (2013.01);
(Continued)

(58) Field of Classification Search
CPC ...... G02F 1/2252; G02F 1/212; G02F 1/0121; G02F 1/0136
(Continued)

(56) References Cited

U.S. PATENT DOCUMENTS 6,072,615 A * 6/2000 Mamyshev .......... H04B 10/505
398/1
6,256,124 B1 * 7/2001 Hait ........................ H04J 14/08
398/9
(Continued)

FOREIGN PATENT DOCUMENTS

EP 1569367 A2 * 8/2005 .......... H04B 10/299
EP 0700178 B1 10/2007
(Continued)

OTHER PUBLICATIONS

Finnish Patent and Registration Office, Office Action, Application No. 20205637, Mailed Feb. 2, 2021, 8 pages.
(Continued)

*Primary Examiner* — Amritbir K Sandhu
(74) *Attorney, Agent, or Firm* — ZIEGLER IP LAW GROUP, LLC.

(57) ABSTRACT

A generator device for generating an arbitrary optical pulse pattern includes:
  a light source to provide primary laser pulses,
  a distributor to provide a plurality of primary optical pulses by distributing light of the primary laser pulses ($LB00_k$) into a plurality of branches,
  a combiner to form an output signal by combining modulated optical signals from the branches, and
  a controller unit to provide control signals for controlling optical modulators of the branches,
  wherein a first branch comprises a first optical modulator to form a first modulated optical signal from primary optical pulses of the first branch,
(Continued)

wherein a second branch comprises a second optical modulator to form a second modulated optical signal from primary optical pulses of the second branch, and wherein a propagation delay of the second branch is different from a propagation delay of the first branch.

27 Claims, 14 Drawing Sheets

(52) U.S. Cl.
CPC ........ *G02F 1/212* (2021.01); *G02F 2201/205* (2013.01); *G02F 2203/54* (2013.01)

(58) Field of Classification Search
USPC .......................................................... 398/98
See application file for complete search history.

(56) References Cited

U.S. PATENT DOCUMENTS

| | | | | |
|---|---|---|---|---|
| 7,983,562 | B1* | 7/2011 | Yap ...................... | H04J 14/005 370/320 |
| 10,009,138 | B2* | 6/2018 | Cavaliere ........... | H04B 10/2575 |
| 10,627,696 | B1* | 4/2020 | Chang .................. | G02F 1/2257 |
| 11,581,946 | B2* | 2/2023 | El Amili ............... | H01S 5/0623 |
| 2002/0003641 | A1 | 1/2002 | Hall et al. | |
| 2005/0095010 | A1* | 5/2005 | Ionov ..................... | H04B 10/60 398/189 |
| 2017/0090267 | A1* | 3/2017 | O'Sullivan .......... | H04B 10/516 |
| 2023/0221613 | A1* | 7/2023 | Nissilä ................. | H04B 10/505 385/2 |

FOREIGN PATENT DOCUMENTS

| | | | |
|---|---|---|---|
| JP | 2004364409 A | * 12/2004 | |
| JP | 2010054937 A | 3/2010 | |
| JP | 2013012866 A | 1/2013 | |
| WO | WO-0186849 A2 | * 11/2001 | ............. H04J 14/06 |

OTHER PUBLICATIONS

International Search Report, Application No. PCT/FI2021/050454, Mailed Sep. 22, 2021, 5 pages.
Written Opinion of The International Searching Authority, Application No. PCT/FI2021/050454, Mailed Sep. 22, 2021, 9 pages.
Japan Patent Office, Notice of Reasons for Rejection, Application No. 2022-575969, Mailed Apr. 30, 2025, 6 pages.
Kherici et al, "Contribution to the performances study of Optical Time Division Multiplexing OTDM an OTDM/WDM hybrid multiplexing at 160 Gbps", US, IEEE, Apr. 3, 2019, 4 pages.

* cited by examiner

OPTICAL ARBITRARY PULSE PATTERN GENERATOR

FIELD

Some embodiments relate to generating an optical pulse pattern.

BACKGROUND

It is known that an arbitrary optical pulse pattern may be generated by using an electric arbitrary pattern generator (APG) to form an electric waveform. The electric waveform may subsequently be used for controlling an optical intensity modulator to modulate continuous wave light or pulsed laser light, so as to form an optical pulse pattern. Forming an arbitrary optical pulse pattern at a frequency higher than 10 GHz may require forming an electric waveform, which has at least the same frequency. However, generating an electric arbitrary waveform accurately at very high frequencies may be difficult or impossible. The generated electric arbitrary waveform may be noisy due to high bandwidth. The shape of the optical pulses formed by the optical modulator at the high frequency may be strongly affected by the noise and/or jitter of the electric waveform.

SUMMARY

The aspects of the disclosed embodiments are directed to providing an optical pattern generator device (APPG). The aspects of the disclosed embodiments are also directed to providing a method for generating an optical pulse pattern.

According to an aspect, there is provided an optical pattern generator device (OPG1), comprising:

a light source (LS1) to provide primary laser pulses ($LB00_k$), a distributor (SPL1) to provide a plurality of primary optical pulses ($LB0_{k,1}, LB0_{k,2}, LB0_{k,3}$) by distributing light of the primary laser pulses ($LB00_k$) into a plurality of branches (A1,A2,A3), a combiner (CMB1) to form an output signal ($LB2_k$) by combining modulated optical signals ($LB1_{k,1}$, $LB1_{k,2}$, $LB1_{k,3}$) from the branches (A1, A2, A3), and a controller unit (PG0) to provide control signals (S1, S2,S3) for controlling optical modulators (MOD1, MOD2, MOD3) of the branches (A1, A2, A3) according to a primary pattern (PAT0), wherein a first branch (A1) comprises a first optical modulator (MOD1) to form a first modulated optical signal ($LB1_{k,1}$) from primary optical pulses ($LB0_{k,1}$) of the first branch (A1), wherein a second branch (A2) comprises a second optical modulator (MOD2) to form a second modulated optical signal ($LB1_{k,2}$) from primary optical pulses ($LB0_{k,2}$) of the second branch (A2), wherein a third branch (A3) comprises a third optical modulator (MOD3) to form a third modulated optical signal ($LB1_{k,3}$) from primary optical pulses ($LB0_{k,3}$) of the third branch (A3), wherein a propagation delay ($d_2$) of the second branch (A2) is different from a propagation delay ($d_1$) of the first branch (A1), and wherein a propagation delay ($d_3$) of the third branch (A3) is different from the propagation delay ($d_1$) of the first branch (A1) and different from the propagation delay ($d_2$) of the second branch (A2).

The scope of protection sought for various embodiments of the invention is set out by the independent claims. The embodiments, if any, described in this specification that do not fall under the scope of the independent claims are to be interpreted as examples useful for understanding various embodiments of the invention.

The device may be an optical arbitrary pulse pattern generator (APPG). The envelope function of the generated pulse sequence may be selectable. The envelope function of the generated pulse sequence may be selectable by a user. The pulse sequence may also be called as a pulse pattern.

The generator device may be arranged to split light of primary laser pulses to a plurality of branches. Each laser pulse may be split into a plurality of primary optical pulses, which may propagate in synchronized manner in the branches of the generator device. Each branch may comprise optical waveguides for guiding the primary optical pulses and/or for providing a suitable (different) propagation delay. The number (M) of the branches may be e.g. in the range of 4 to 1024. Using a higher number of branches may provide a higher output pulse repetition rate and/or may allow providing a pulse pattern with a higher temporal resolution.

Each branch may comprise a separately controllable modulator to form modulated signals from the primary optical pulses. The branches may be arranged to provide different propagation delays such that when the modulated signals are recombined, the pulses of the modulated signals may be interleaved to form a desired output signal. The optical output signal may comprise a pulse pattern, which corresponds to a desired primary pattern. The maximum pulse rate of the output signal may be e.g. M times the pulse rate of the laser pulses.

The generator device may be arranged to operate as a repetition rate multiplication and pulse pattern formation system. The generator device may be arranged to keep the quality of the pulses substantially unchanged when splitting, modulating, and combining the pulses.

The device may comprise a distributor to form the primary optical pulses from the laser pulses. The laser pulses may be provided e.g. by a mode-locked laser. The splitting and the combining may be implemented by using passive optics. The splitting, the modulation, and/or the combination may be performed substantially without deforming the shape of the optical pulses.

The modulator of a branch may form a modulated signal from the primary optical pulses. The modulator may either allow a primary optical pulse to pass through the modulator to the combiner, or the modulator may prevent propagation of the primary optical pulse to the combiner. The state of the modulator may be e.g. a pass state or a block state. The modulator may be e.g. a Mach Zehnder modulator. The state of the modulator may be controlled e.g. by applying a control voltage signal to the modulator. The control voltage signal may comprise control signal pulses.

A control unit may be arranged to generate electrical control signals to the modulators. The control unit may comprise a memory for storing a primary pattern. The primary pattern may comprise e.g. a sequence of binary values, so as to define an envelope function of the desired optical pulse pattern. The control unit may comprise e.g. programmable logic (FPGA) to provide binary control signals to a driving unit, according to the values of the primary pattern. (FPGA means field-programmable gate array). A driving unit may form control signals for the modulators based on the binary control signals.

The optical output of the generator may essentially consist of a sequence of return-to-zero (RZ) optical pulses. The sequence may represent e.g. an arbitrary binary pattern. The output may be a substantially binary optical signal, which may be formed according to a primary pattern. Each output value of the sequence (at a quantized time) may either be substantially equal to a full amplitude value or substantially equal to zero. The frequency ($M \cdot f_0$) of the pulses may be e.g. higher than 10 Gbit/s. A minimum time between rising edges of consecutive pulses of the output may be e.g. shorter than 1 ns, respectively.

The base repetition rate ($f_0$) of the primary laser pulses may be e.g. in the range of 1 GHz to 10 GHz. In particular, the base repetition rate ($f_0$) of the primary laser pulses may be e.g. in the range of 2 GHz to 3 GHz. The control electronics may be arranged to operate e.g. at a frequency, which is equal to the base repetition rate of the primary laser pulses. The maximum pulse repetition rate of a control signal applied to a modulator of a branch may be substantially smaller than the maximum pulse repetition rate of the optical output signal of the generator device. The state of the modulators of the pattern generator device may be changed at a rather moderate rate, which may be smaller than or equal to the repetition rate of the primary laser pulses. The change of state of the modulators may be timed by using an advance interval, so as to reduce (amplitude) noise of the optical output signal.

The change of state of the modulators may be synchronized with the primary optical pulses. A primary optical pulse may arrive at a modulator at the last moment near the falling edge of a control signal pulse, so as to give the modulator longest possible time to settle at its targeted state.

As an example, the base pulse rate (base frequency $f_0$) of the primary optical pulses may be e.g. 2 GHz, and the time interval ($T_0$) between neighboring primary optical pulses of a single branch may be 500 ps, respectively. The temporal width ($w_0$) of a single primary optical pulse may be e.g. 10 ps. The timing of the control pulses (S1) applied to the modulator (MOD1) may be selected such that there is little or no residual ringing left arising from the state change of state when the primary optical pulse ($LB0_k$) arrives at the modulator. The generator device may be arranged to operate e.g. such that a primary optical pulse ($LB0_k$) arrives at the modulator (MOD1) approximately 450 ps after the initiation of a previous change of state of the control signal (S1) applied to the modulator (MOD1). The advance time interval (Tc) for allowing stabilization of the state of the modulator may be e.g. 450 ps.

The amplitude of the pulses of the optical output signal may be substantially independent of preceding signal values. The optical output signal may be substantially free of memory effects.

The control unit may be arranged to generate electrical control signals with low noise. The control unit may comprise e.g. a driving unit, which couples an electrical control input of a modulator either to a first voltage ($V_1$) or to a second different voltage ($V_2$). The first voltage ($V_1$) and/or the second voltage ($V_2$) may be provided by a low noise (direct-current) voltage supply. The driving unit of the control unit may comprise a driving circuit, which is arranged to switch between the two low-noise DC voltages ($V_1$, $V_2$).

The optical output signal of the optical pulse sequence generator may have a high quality e.g. with respect to pulse amplitude and temporal noise (jitter).

The output of the optical pattern generator device may be optionally converted into an electric signal, e.g. in order to provide an arbitrary electrical waveform. The converted electric signal may have accurate timing and/or accurate waveform. The output of the optical pattern generator device may be converted into an electric signal, e.g. by using a photodiode.

In an embodiment, one or more functional units of the optical pulse sequence generator may be implemented on a substrate. For example, the branches may be formed by implementing optical waveguides, modulators and/or optical delay lines on a substrate. For example, the laser, the distributor, the branches, and/or the combiner may be implemented on a substrate. The substrate may be e.g. a silicon substrate or a GaAs substrate. GaAs means gallium arsenide. Implementing the units on the substrate may reduce size, may allow operation at a higher frequency, may improve quality of the pulses of the output signal, may improve stability, may improve reliability, and/may reduce manufacturing costs.

In an embodiment, the optical output of the generator device may be coupled via an optical waveguide from a higher temperature to a cryogenic temperature. The cryogenic temperature may be e.g. smaller than or equal to 4.2 K. K means Kelvin. Guiding the optical signal into a cryostat may help to avoid crosstalk and/or thermal effects, when compared with feeding an electrical signal into the cryostat. The optical signal may be optionally converted into an electrical signal in the cryostat, if needed. The pulses of the optical signal may be converted into an electrical signal e.g. by using one or more photodiodes, if needed.

In an embodiment, the optical output of the generator device may be used e.g. for driving a Josephson junction voltage standard.

BRIEF DESCRIPTION OF THE DRAWINGS

In the following examples, several variations will be described in more detail with reference to the appended drawings, in which.

DETAILED DESCRIPTION

Figure 1A:
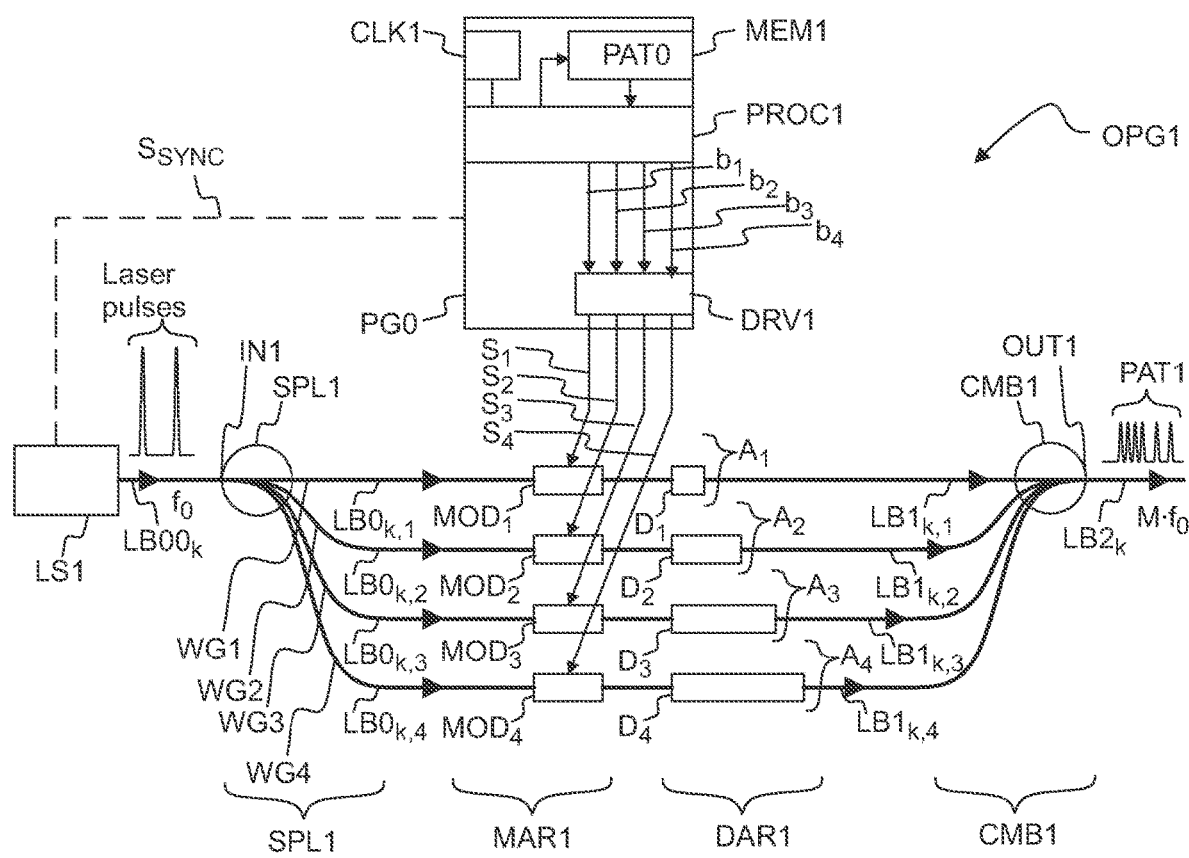
FIG. 1a shows, by way of example, an optical pattern generator device.

Referring to FIG. 1a, the optical pattern generator device OPG1 may comprise a light source LS1 to provide primary light pulses LB00, two or more branches (A1, A2, . . . ), a distributor SPL1 to distribute light of the primary light pulses LB00 to the branches (A1, A2), a combiner CMB1 to combine modulated signals of the branches (A1, A2), and a control unit PG0 to provide control signals (S1, S2, . . . ) for forming the modulated signals from the optical pulses (LB0).

The light source LS1 may be arranged to provide primary light pulses LB00, which have a predetermined temporal width ($w_{00}$). The light source LS1 may be arranged to provide the primary light pulses LB00 at a constant repetition rate $f_0$. The light source LS1 may be e.g. a mode-locked laser. The light source LS1 may comprise a mode-locked laser. The light source LS1 may be arranged to provide laser pulses e.g. with uniform amplitude and/or with low (temporal) jitter.

The primary light pulses LB00 may also be called e.g. as primary laser pulses LB00.

The distributor SPL1 may form primary optical pulses (LB0) by distributing light of the primary laser pulses LB00 to the branches (A1, A2, . . . ). The distributor SPL1 may comprise an optical input IN1 for receiving primary light pulses LB00. The combiner CMB1 may receive modulated signals LB1 from the different branches A1, A2. The combiner CMB1 may form a combined optical output signal LB2 by combining the modulated signals LB1 of the different branches A1, A2. The combiner CMB1 may comprise an optical output OUT2 for providing the output signal LB2.

The device OPG1 may comprise a plurality of optical branches A1, A2, A3, A4, . . . . The number (m) of the branches may be e.g. in the range of 10 to 1000. The number (m) of the branches may be e.g. greater than or equal to 4. The number (m) of the branches may be e.g. in the range of 4 to 1024.

The distributor SPL1 may receive primary laser pulses LB00 at a pulse repetition frequency $f_0$. The output signal LB2 may have a maximum pulse repetition frequency $M \cdot f_0$, wherein the integer M may denote the number of the branches of the device OPG1.

Each branch (A1, A2, . . . ) may comprise an optical modulator MOD for forming a modulated signal (LB1) from the primary optical pulses (LB0). The modulator may comprise e.g. a controllable interferometer. The modulator MOD may be e.g. a Mach Zehnder modulator.

The modulator MOD may be e.g. an electrically controllable Mach Zehnder modulator. The modulator MOD may have a first operating state which allows propagation of a primary optical pulse through the modulator MOD, and a second operating state which prevents propagation of a primary optical pulse through the modulator MOD. The state of the modulator MOD may be set by applying a control signal S to the modulator MOD. The modulator may be set to the first state by applying a control signal pulse to the modulator MOD. The modulator MOD may form a modulated optical signal LB1 by modulating the primary optical pulses (LB0).

The device OPG1 may comprise waveguides or waveguide portions WG1, WG2, for guiding the primary optical pulses LB0 and/or for guiding the modulated optical signals LB1.

Each branch A1, A2 may be arranged to cause a propagation delay d1, d2. Each branch A1, A2 may comprise a delay line D1, D2 for causing a propagation delay d1, d2. The device OPG1 may be arranged to operate such that the propagation delay d1 of a first branch A1 is different from the propagation delay d2 of a second branch A2. The propagation delay d3 of a third branch A3 may be different from the propagation delay d1 of the first branch A1 and different from the propagation delay d2 of the second branch A2. In particular, each branch may have a different propagation delay, so as to maximize pulse repetition rate of the output signal formed by combining the modulated signals of the branches. The delay lines may be arranged to operate such that the minimum difference between propagation delays (d1, d2) of a first branch and another branch may be substantially equal to $1/(M \cdot f_0)$. Each branch may have a different propagation delay e.g. in order to avoid combining overlapping pulses at the combiner.

The distributor SPL1 may form primary optical pulses $LB0_{k,1}$, $LB0_{k,2}$, $LB0_{k,3}$, $LB0_{k,4}$, by simultaneously distributing light of a primary laser pulse $LB00_k$ to the branches A1, A2, A3, A4. The shape of each optical pulse $LB0_{k,1}$, $LB0_{k,2}$, $LB0_{k,3}$, $LB0_{k,4}$ may be substantially similar to the shape of the laser pulse $LB00_k$. The (maximum) optical power of each optical pulse $LB0_{k,1}$, $LB0_{k,2}$, $LB0_{k,3}$, $LB0_{k,4}$ may be substantially equal to 1/M times the (maximum) optical power of the primary laser pulse $LB00_k$. M denotes the number of the branches.

A first optical branch $A_1$ of the device OPG1 may comprise a first modulator $MOD_1$, and a delay line $D_1$. The delay line $D_1$ may be implemented e.g. by a waveguide portion (WG1). The delay line $D_1$ may be positioned e.g. before or after the modulator. The modulator $MOD_1$ of the first branch $A_1$ may provide a first modulated optical signal $LB1_{k,1}$ by modulating an optical pulse $LB0_{k,1}$ according to the control signal $S_1$.

A second optical branch A2 of the device OPG1 may comprise a second modulator MOD2, and a delay line D2. The modulator $MOD_1$ of the second branch A2 may provide a second modulated optical signal $LB1_{k,2}$ by modulating an optical pulse $LB0_{k,2}$ according to the control signal S2.

The device OPG1 may comprise a control unit PG0 to form control signals S1, S2 for controlling the modulators MOD1, MOD2 of the branches A1, A2. The control unit PG0 may comprise multiple (parallel) outputs for providing separate control signals S1, S2 for each modulator MOD1, MOD2. The timing of each control signal S1, S2 may be based on the synchronization signal STAG and/or on a timing signal obtained from a clock CLK1. The control unit PG0 may comprise e.g. a clock CLK1, a pattern memory MEM1, a data processor PROC1, and a driving unit DRV1.

The pattern memory MEM1 may be configured to store a primary pattern PAT0. The primary pattern PAT0 may e.g. comprise or consist of a group of values $b_1$, $b_2$, $b_3$, $b_4$, ..., for defining an envelope function of the output signal LB2 of the device OPG1. An example of the values ($b_{k,1}$, $b_{k,2}$, ...) of a primary pattern PAT0 is shown also in FIG. 2c. The values $b_1$, $b_2$, $b_3$, $b_4$ may be e.g. binary values. Each binary value may be either zero or one. The data processor PROC1 may read the values $b_1$, $b_2$, $b_3$, $b_4$ from the pattern memory MEM1, and the data processor PROC1 may control operation of the driving unit DRV1 based on the values $b_1$, $b_2$, $b_3$, $b_4$ of the primary pattern PAT0, so as to form the control signals S1, S2, S3, S4. Each control signal S1 may be e.g. an electrical signal, which may have a first voltage value ($V_1$) or a second voltage value ($V_2$). Applying the first voltage value to a modulator MOD1 may set the state of the modulator MOD1 to a first pass state, for allowing an optical pulse to propagate through the modulator. Applying the second voltage value to the modulator MOD1 may set the state of the modulator MOD1 to a second blocking state, for preventing propagation of an optical pulse.

The data processor PROC1 may initiate change of state of the modulators by sequentially feeding a primary control signals (e.g. the values $b_1$, $b_2$, $b_3$, $b_4$) to the driving unit DRV1.

Forming of the control signals S1, S2, S3, S4 may be synchronized with the laser pulses LB00. The device OPG1 may be arranged to provide a synchronization signal $S_{TRG1}$ for timing operation of the control unit PG0 with the operation of the light source LS1. The device OPG1 may optionally comprise a converter CON1 for converting an optical synchronization signal $S_{TRG1}$ into an electrical synchronization signal $S_{TRG1}$, if needed.

The waveguides WG1, WG2, WG3, WG4 may be e.g. optical fibers. The distributor SPL1, the modulators MOD1, MOD2, and the combiner CBM1 may be e.g. discrete optical components.

One or more functional parts (SPL1, WG1, MOD, D1, CMB1) of the device OPG1 may also be implemented e.g. a common substrate. The substrate may be e.g. silicon or gallium arsenide substrate.

The light source LS1 may optionally comprise an optical amplifier to increase power of the primary light pulses LB00. For example, the optical amplifier may be arranged to provide the primary light pulses LB00 e.g. by amplifying laser pulses obtained from a seed pulse laser.

The optical pattern generator device OPG1 may generate an optical pulse pattern OPAT1 e.g. by a method, which comprises:

splitting a primary laser pulse (LB00) into several primary optical pulses (LB0), guiding the primary optical pulses (LB0) to propagate along different optical branches (A1, A2, A3, A4) of the device OPG1, forming modulated light signals (LB1) by modulating the optical pulses (LB0) propagating along the different optical branches ($A_1$, $A_2$, $A_3$, $A_4$), delaying the modulated light signals (LB1) or delaying the optical pulses (LB0) by different delay times ($\Delta t_{D1}$, $\Delta t_{D2}$, $\Delta t_{D3}$, $\Delta t_{D4}$), and forming an optical signal (LB2) by combining the delayed modulated signals (LB1) from the different optical branches ($A_1$, $A_2$, $A_3$, $A_4$).

The primary pulses (LB00) may be e.g. laser pulses obtained from a laser light source. The optical pattern generator device OPG1 may comprise e.g. a laser source to provide laser pulses.

The optical pattern generator device OPG1 may comprise one or more splitters SPL1 to split the primary laser pulses (LB00) into several primary optical pulses (LB0).

The optical pattern generator device OPG1 may comprise one or more arrays MAR1, of modulators MOD1, MOS2, MOD3, MOD4 to form modulated light signals (LB1) from the optical pulses (LB0) or from the delayed optical pulses (LB0). The modulators may be e.g. Mach Zehnder modulators.

The optical pattern generator device OPG1 may comprise one or more arrays DAR1 of delay lines D1, D2, D3, D4 to provide different delay times ($\Delta t_{D1}$, $\Delta t_{D2}$, $\Delta t_{D3}$, $\Delta t_{D4}$) for the different branches ($A_1$, $A_2$, $A_3$, $A_4$) of the generator device OPG1. The delay lines may be implemented e.g. by waveguides of different lengths.

The optical pattern generator device OPG1 may comprise one or more combiners CMB1 to combine the delayed modulated signals (LB1) from the different optical branches ($A_1$, $A_2$, $A_3$, $A_4$).

Each branch ($A_1$, $A_2$, $A_3$, $A_4$) may comprise an independently controllable modulator (MOD1, MOS2, MOD3, MOD4) and a delay line D1, D2, D3, D4.

An output OUT1 of the combiner CMB1 may provide an optical signal LB2, which comprises the desired arbitrary optical pulse pattern PAT1. The maximum pulse repetition rate of the optical pulse pattern PAT1 at the combiner output OUT1 may be equal to $M \cdot f_0$, where $f_0$ denotes the repetition rate of the primary pulses (LB00), and M denotes the number of the branches ($A_1$, $A_2$, $A_3$, $A_4$), which provide signals for said combiner CMB1. The number M of the branches may be e.g. in the range of 4 to 1024.

Figure 1B:
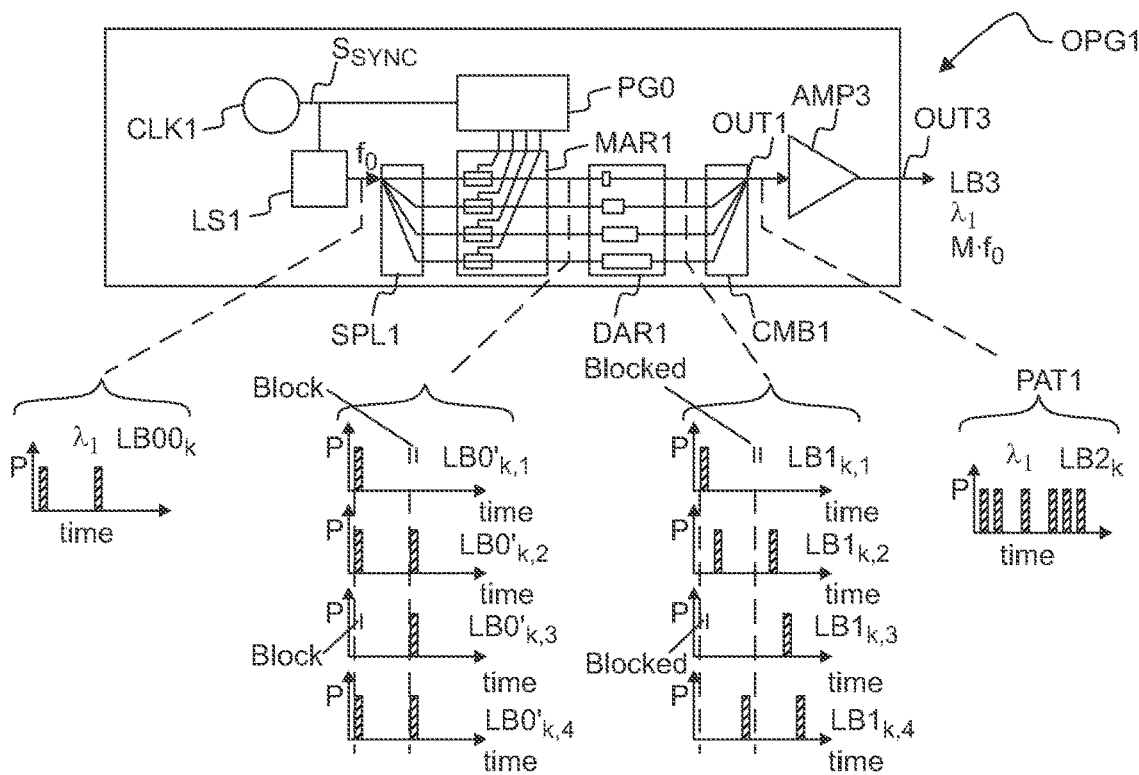
FIG. 1b shows, by way of example, an optical pattern generator device.
Figure 1C:
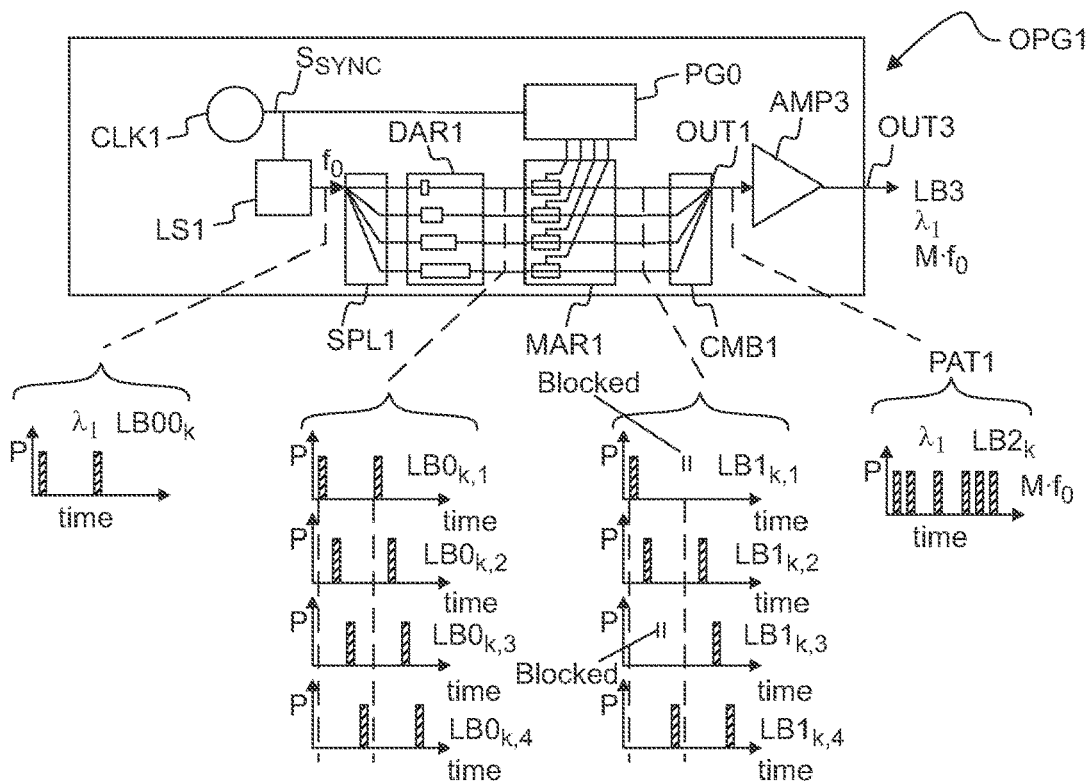
FIG. 1c shows, by way of example, an optical pattern generator device.

Referring to FIGS. 1b and 1c, the optical pattern generator device OPG1 may optionally comprise one or more optical amplifiers (AMP3) to amplify the optical power of the optical pulses. For example, an optical amplifier AMP3 may provide an amplified output signal LB3 by optically amplifying the pulses LB2 obtained from an output OUT1 of a combiner CMB1.

Referring to FIG. 1b, the modulators (MOD1, MOS2, MOD3, MOD4) may form modulated primary signals (LB0) by modulating the primary optical pulses (LB0). The delay lines (D1, D2, D3, D4) may form delayed modulated signals (LB1) from the modulated primary signals (LB0).

Referring to FIG. 1c, the delay lines (D1, D2, D3, D4) may also be positioned between the splitter SPL1 and the modulators (MOD1, MOS2, MOD3, MOD4). In that case the modulators may form the modulated delayed signals (LB1) by modulating delayed optical pulses (LB0).

In an embodiment, the timing of the primary pulses (LB00) may be synchronized with a clock CLK1, e.g. by using a synchronization signal S SYNC.

In an embodiment, the timing of the primary pulses (LB00) may even be traceable to the frequency of an atomic clock (CLK1).

The state of each modulator may be set to a pass state or to a blocking state. In the blocking state the modulator may prevent propagation of an optical pulse. In the pass state the modulator may allow propagation of an optical pulse. Consequently, the modulator may provide an existing optical pulse in the pass state. The modulator may provide a missing optical pulse in the blocking state.

The optical pattern generator device OPG1 may comprise a control unit PG0 to control the states of the modulators. The optical pattern generator device OPG1 may comprise a memory MEM1 for storing a primary pattern PAT0. The control unit PG0 may comprise one or more data processors PROC1 to provide control signals $b_1$, $b_2$, $b_3$, $b_4$ for changing the states of the modulators according to the primary pattern PAT0 and according to the timing signal $S_{SYNC}$. The optical pattern generator device OPG1 may optionally comprise a driving unit DRV1 to amplify the control signals $b_1$, $b_2$, $b_3$, $b_4$, if needed. For example, a driving unit DRV1 may provide high voltage driving signals S1, S2, S3, S4 for the modulators based on the control signals $b_1$, $b_2$, $b_3$, $b_4$, if needed.

Each modulator may be modulated with a frequency, which is smaller than or equal to the repetition rate of the primary optical pulses LB00.

The maximum modulation frequency of each modulator (MOD1, MOS2, MOD3, MOD4) may be equal to the repetition rate $f_0$ of the primary pulses (LB00). The repetition rate $f_0$ of the primary pulses (LB00) may be e.g. smaller than 10 GHz, or even smaller than 1 GHz. Even when generating an arbitrary waveform, it is not necessary to change the state of an individual modulator at a rate which is higher than $f_0$. Consequently, the maximum pulse repetition rate of the optical pulse pattern PAT1 may be higher than the maximum modulation rate of each individual modulator.

Figure 2A:
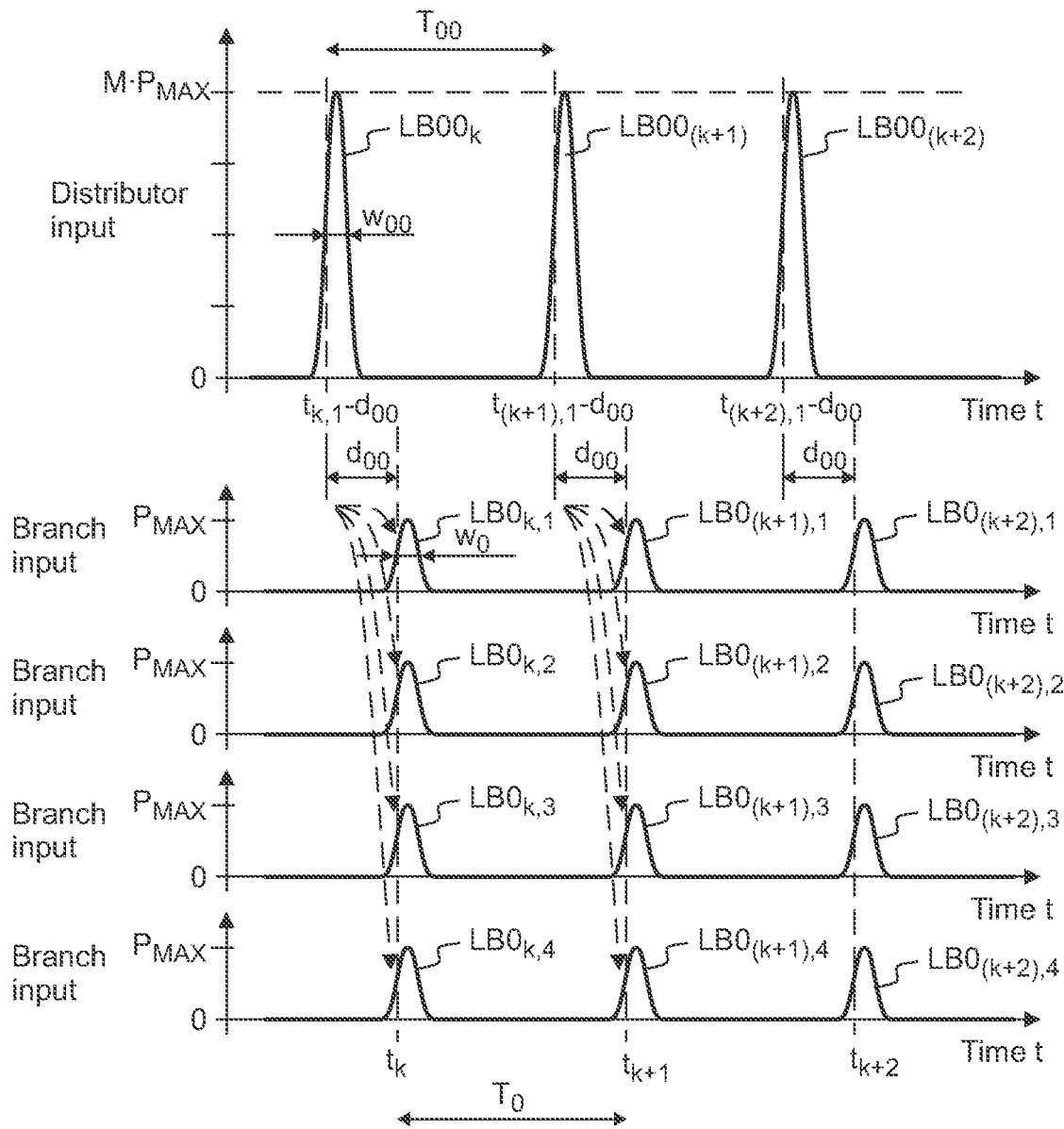
FIG. 2a shows, by way of example, forming primary optical pulses from primary laser pulses.

FIG. 2a shows, by way of example, forming primary optical pulses $LB0_{k,1}$, $LB0_{k,2}$, $LB0_{k,3}$, $LB0_{k,4}$ from light of a primary laser pulse $LB00_k$. The distributor SPL1 may form the primary optical pulses $LB0_{k,1}$, $LB0_{k,2}$, $LB0_{k,3}$, $LB0_{k,4}$ by distributing the light of the primary laser pulse $LB00_k$. The symbol doo may denote a propagation delay. The propagation delay doo may denote e.g. an optical propagation delay from the input IN1 of the distributor SPL1 to the modulator $MOD_1$. $P_{MAX}$ may denote maximum power of each optical pulse $LB0_{k,1}$, $LB0_{k,2}$, $LB0_{k,3}$, $LB0_{k,4}$. The optical pulse $LB0_{k,1}$ of the first branch A1 may arrive at the modulator MOD1 of the first branch A1 at the time $t_k$.

The symbol $T_{00}$ may denote the time interval between consecutive laser pulses $LB00_k$, $LB00_{k+1}$. The time interval $T_{00}$ may be defined e.g. by the rising edges of the laser pulses $LB00_k$, $LB00_{k+1}$. The symbol $T_0$ may denote the time interval between consecutive optical pulses $LB0_{k,1}$, $LB0_{(k+1),1}$. The time interval $T_0$ may be defined e.g. by the rising edges of the optical pulses $LB0_{k,1}$, $LB0_{(k+1),1}$. The time interval $T_0$ may be equal to the time interval $T_{00}$. The pulse repetition frequency $f_0$ of the light source LS1 may be equal to $1/T_{00}$. The pulse repetition frequency $f_0$ of the light source LS1 may be e.g. in the range of 1 GHz to 10 GHz. The pulse repetition frequency $f_0$ of the light source LS1 may be e.g. in the range of 2 GHz to 5 GHz.

The symbol $w_{00}$ may denote temporal width of the laser pulses $LB00_k$, $LB00_{k+1}$. The symbol $w_0$ may denote temporal width of the optical pulses $LB0_{k,1}$, $LB0_{(k+1),1}$. The width $w_0$ may be substantially equal to the width $w_{00}$. The temporal width $w_0$ of the laser pulses $LB00_k$, $LB00_{k+1}$ may be e.g. in the range of 1 ps to 100 ps.

Figure 2B:
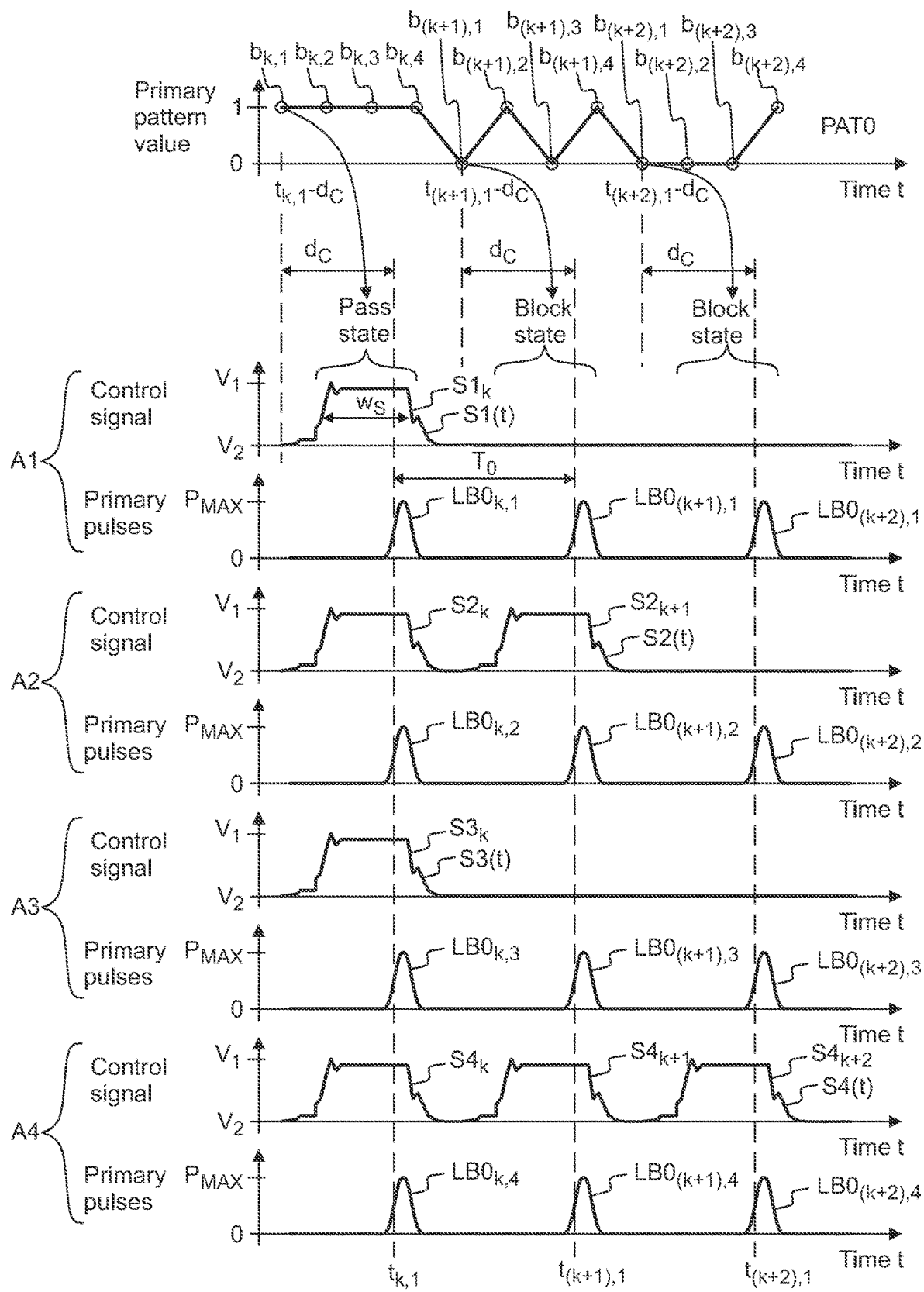
FIG. 2b shows, by way of example, forming modulated signals from primary optical pulses.

FIG. 2b shows, by way of example, forming modulated signals LB1 from primary optical pulses LB0 according to a primary pattern PAT0. The primary pattern PAT0 may be defined e.g. by a sequence of values. The primary pattern PAT0 may comprise e.g. a sequence of values $b_{k,1}$, $b_{k,2}$, $b_{k,3}$, $b_{k,4}$, $b_{(k+1),1}$, $b_{(k+1),2}$, $b_{(k+1),3}$, $b_{(k+1),4}$, $b_{(k+2),1}$, $b_{(k+2),2}$, $b_{(k+2),3}$, $b_{(k+2),4}$. The primary pattern PAT0 may comprise e.g. a sequence of binary values. The values (b) of the primary pattern PAT0 may be e.g. stored in a memory MEM1 of the device OPG1.

The control unit PG0 may provide control signals S1, S2, S3, S4 according to the primary pattern PAT0 for controlling the modulator of each branch A1, A2, A3, A4 of the device OPG1.

A primary optical pulse $LB0_{k,1}$ may arrive at the input of the modulator MOD1 of the first branch A1 at a time $t_k$. The control unit PG0 may initiate change of state of the modulator MOD1 in advance before the primary optical pulse $LB0_{k,1}$ arrives at the modulator MOD1. The symbol dc may denote a time interval between initiating the change of state and the arrival. The time interval dc may also be called e.g. as an advance interval. The advance interval dc may be e.g. in the range of 50% to 90% of the interval $T_0$ between consecutive primary optical pulses $LB0_{k,1}$, $LB0_{(k+1),1}$ of the first branch A1. The advance interval dc may improve stability of the modulated signal LB1 and/or may keep the maximum frequency of the control signal S1 smaller than or equal to the base frequency $f_0$.

The control signal S1 applied to the modulator MOD1 may comprise control signal pulses. For example, a primary optical pulse $LB0_{k,1}$ may be modulated by forming a control signal pulse $S1_k$. The symbol $w_s$ may denote temporal width of the control signal pulse $S1_k$. The temporal width $w_s$ of the control signal pulse $S1_k$ may be e.g. in the range of 50% to 90% of the interval $T_0$ between consecutive primary optical pulses $LB0_{k,1}$, $LB0_{(k+1),1}$ of the first branch A1.

The advance interval dc and/or the temporal width $w_s$ may be selected so as to keep the modulator MOD1 in the passing state when the primary optical pulse $LB0_{k,1}$ passes through the modulator MOD1.

The modulator MOD1 of the first branch A1 may form a first modulated signal LB1 by modulating primary optical pulses $LB0_{k,1}$, $LB0_{(k+1),1}$, $LB0_{(k+2),1}$, . . . .

The modulator MOD1 of the first branch A1 may be controlled based on a first subset of values of the primary pattern PAT0. The first subset may comprise e.g. the values $b_{k,1}$, $b_{(k+1),1}$, $b_{(k+2),1}$. The control unit PG0 may form control signal S1 according to the first subset. The control signal S1 may be applied to the modulator MOD1 so as to enable and/or prevent propagation of the optical pulses $LB0_{k,1}$, $LB0_{(k+1),1}$, $LB0_{(k+2),1}$, . . . of the first branch A1. For example, the control signal S 1(t) corresponding to the control value $b_{k,1}$ may set the modulator MOD1 to the passing state to allow propagation of the pulse $LB0_{k,1}$ at the time $t_{k,1}$. The pulse $LB0_{k,1}$ may subsequently propagate to the combiner CMB1. For example, the control signal S1(t) corresponding to the control value $b_{(k+1),1}$ may set the modulator MOD1 to the blocking state to prevent propagation of the pulse $LB0_{(k+1),1}$ at the time $t_{(k+1),1}$. Consequently, the modulator MOD1 may prevent propagation of the pulse $LB0_{(k+1),1}$ via the branch A1 to the combiner CMB1.

The modulator MOD2 of the second branch A2 may form a second modulated signal LB1 by modulating primary optical pulses $LB0_{k,2}$, $LB0_{(k+1),2}$, $LB0_{(k+2),2}$, . . . .

The modulator MOD2 of the second branch A2 may be controlled based on a second subset of values of the primary pattern PAT0. The second subset may comprise e.g. the values $b_{k,2}$, $b_{(k+1),2}$, $b_{(k+2),2}$. The control unit PG0 may form control signal S2 according to the second subset. The control signal S2 may be applied to the modulator MOD2 so as to enable and/or prevent propagation of the optical pulses $LB0_{k,2}$, $LB0_{(k+1),2}$, $LB0_{(k+2),2}$, . . . of the second branch A2.

In a similar manner, a third subset of values of the primary pattern PAT0 may comprise e.g. the values $b_{k,3}$, $b_{(k+1),3}$, $b_{(k+2),3}$. Optical pulses $LB0_{k,3}$, $LB0_{(k+1),3}$, $LB0_{(k+2),3}$, ... of the third branch A3 may be modulated according to the third subset of values of the primary pattern PAT0.

In a similar manner, a fourth subset of values of the primary pattern PAT0 may comprise e.g. the values $b_{k,4}$, $b_{(k+1),4}$, $b_{(k+2),4}$. Optical pulses $LB0_{k,4}$, $LB0_{(k+1),4}$, $LB0_{(k+2),4}$, ... of the fourth branch A4 may be modulated according to the fourth subset of values of the primary pattern PAT0.

Figure 2C:
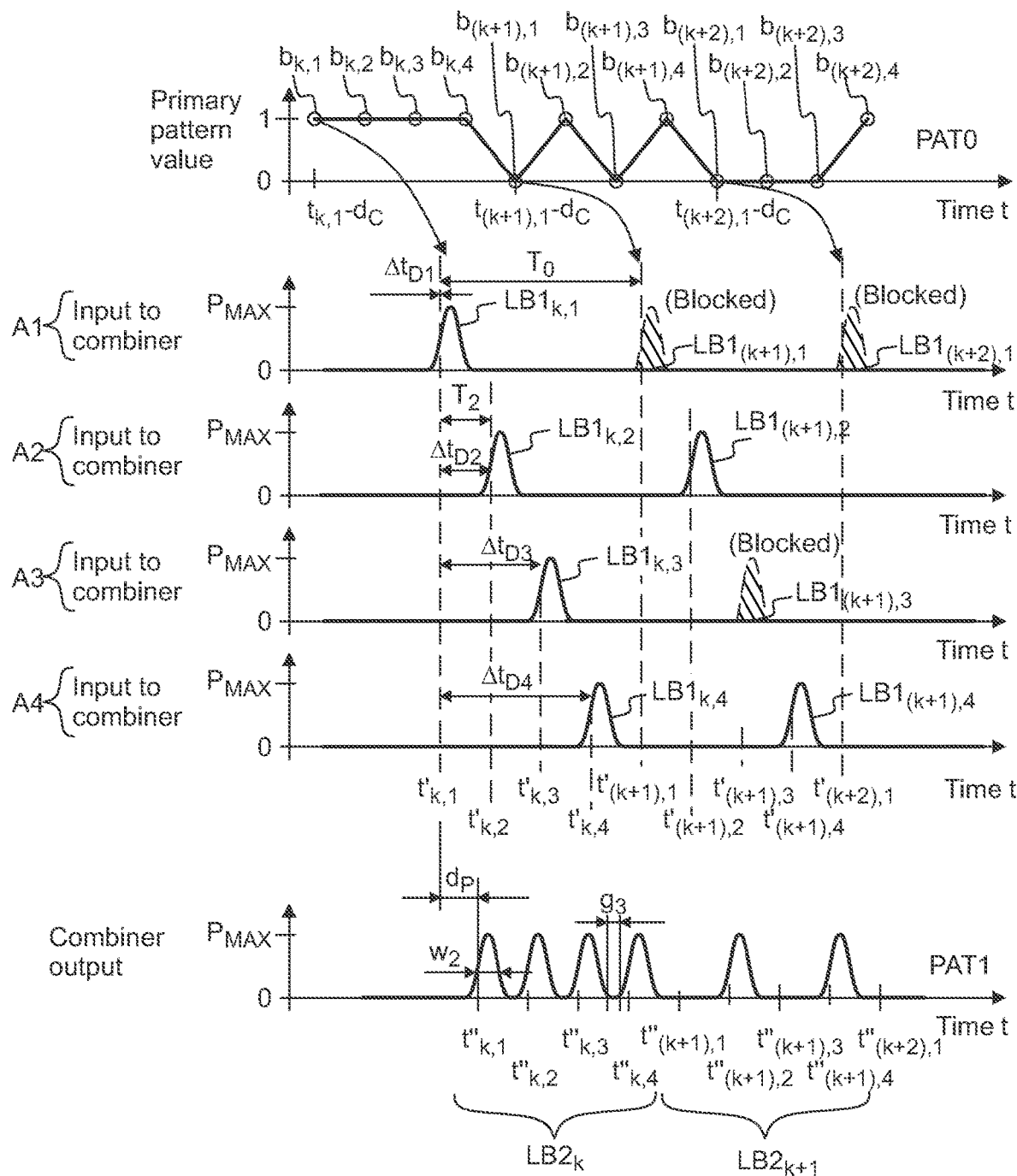
FIG. 2c shows, by way of example, forming an output signal by combining modulated signals.

Referring to FIG. 2c, the passed pulses may propagate to the combiner, whereas the blocked pulses do not propagate to the combiner. The combiner may form an optical output by combining the passed pulses.

An optical pulse $LB0_{k,1}$ may arrive at the modulator MOD1 at a time $t_{k,1}$. A signal $LB1_{k,1}$ formed by modulating said optical pulse $LB0_{k,1}$ may arrive at the combiner CMB1 slightly later at a time $t'_{k,1}$. The modulated optical signal $LB1_{k,1}$ may contribute to the combined output signal LB2 slightly later at a time $t''_{k,1}$. The time $t''_{k,1}$ may denote a departure time of the signal portion $LB2_{k,1}$ at the output OUT2 of the combiner CMB1. The time $t''_{k,2}$ may denote the departure time of the signal portion $LB2_{k,2}$ at the output OUT2 of the combiner CMB1. The signal portions $LB2_{k,1}$, $LB2_{k,2}$, $LB2_{k,3}$, $LB2_{k,4}$ may be derived from the same primary laser pulse $LB00_k$. The signal portions $LB2_{k,1}$, $LB2_{k,2}$, $LB2_{k,3}$, $LB2_{k,4}$ may be indirectly formed from the same primary laser pulse $LB00_k$.

The modulated optical signal LB1 of the first branch A1 may comprise signal portions $LB1_{k,1}$, $LB1_{(k+1),1}$, $LB1_{(k+2),1}$. The signal portion $LB1_{k,1}$ may arrive at the combiner at time $t'_{k,1}$. The signal portion $LB1_{(k+1),1}$ may arrive at the combiner at time $t'_{(k+1),1}$. The signal portion $LB1_{(k+2),1}$ may arrive at the combiner at time $t'_{(k+2),1}$. The hatched areas shown in FIG. 2c may indicate signal portions ($LB1_{(k+1),1}$, $LB1_{(k+2),1}$) where the modulator MOD1 has blocked the pulses, wherein said blocking is performed according to values $b_{(k+1),1}$, $b_{(k+2),1}$ of the first subset of the primary pattern PAT0. The signal portion $LB1_{k,1}$ may comprise a pulse, which has passed via the modulator MOD1 according to the value $b_{k,1}$ of the first subset of the primary pattern PAT0.

The symbol dc may denote an advance interval for controlling the modulator of the first branch A1. The symbol $d_P$ may denote a propagation delay from the input of the combiner to the output of the combiner.

The propagation delay ($d_2$) of the second branch A2 may be different from the propagation delay ($d_1$) of the first branch A1. Consequently, a second pulse $LB1_{k,2}$ which has passed through the modulator MOD2 of the second branch A2 may arrive at the combiner CBM1 slightly later than a first pulse $LB1_{k,1}$ which has passed through the modulator MOD1 of the first branch A1, in a situation where the first pulse $LB1_{k,1}$ and the second pulse $LB1_{k,2}$ are formed from the same primary laser pulse $LB00_k$.

The propagation delays ($d_1$, $d_2$, $d_3$, $d_4$) of the different branches (A1, A2, A3, A4) of the device OPG1 may be selected e.g. such that the departure times ($t''_{k,1}$, $t''_{k,2}$, $t''_{k,3}$, $t''_{k,4}$) of the output pulses ($LB2_{k,1}$, $LB2_{k,2}$, $LB2_{k,3}$, $LB2_{k,4}$) may be substantially evenly distributed in time at the output OUT2 of combiner CMB1, in a situation where the output pulses ($LB2_{k,1}$, $LB2_{k,2}$, $LB2_{k,3}$, $LB2_{k,4}$) are formed from the same primary laser pulse $LB00_k$.

The symbol T2 may denote a minimum time interval between the rising edge of the first pulse $LB1_{k,1}$ at the combiner and the rising edge of the second pulse $LB1_{k,2}$ at the combiner. The minimum time interval (T2) between rising edges of consecutive pulses ($LB2_{k,1}$, $LB2_{k,2}$) of the output signal ($LB2_k$) may be e.g. smaller than 1 ns.

FIG. 2c shows, by way of example, an optical modulated signal LB2 formed by combining the modulated optical signals LB1 of the different branches A1, A2, A3, A4. A signal sequence $LB2_k$ may be formed from modulated and delayed optical pulses, which are derived from a first primary laser pulse $LB00_k$. A signal sequence $LB2_{k+1}$ may be formed from modulated and delayed optical pulses, which are derived from a second primary laser pulse $LB00_{k+1}$. The optical output signal LB2 may comprise an optical pulse pattern PAT1 formed according to the primary pattern PAT0.

The device OPG1 may be arranged to operate such that consecutive pulses of the output signal LB2 do not overlap, so as to prevent interference at the combiner. For example, a minimum time interval $g_3$ between falling edge of a first pulse and a rising edge of a next pulse may be e.g. greater than or equal to 1 ps.

The symbol, $w_2$ may denote temporal width of a pulse of the output signal LB2. The width $w_2$ of the output pulses may be e.g. substantially equal to the width $w_{00}$ of the primary laser pulses LB00.

Figure 3:
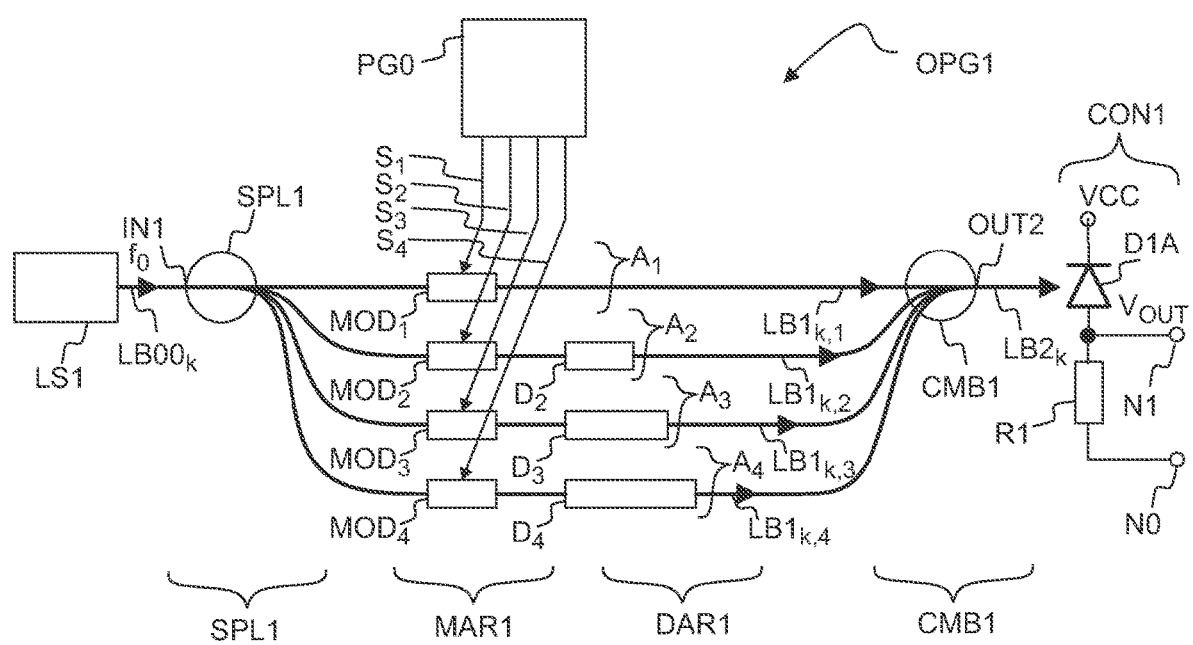
FIG. 3 shows, by way of example, converting an optical output signal into an electrical output signal.

Referring to FIG. 3, the device OPG1 may optionally comprise a converter unit CON1 for converting the optical output LB2 into an electrical output VOUT. The converter CON1 may comprise e.g. one or more photodiodes D1A. The photodiode D1A may be e.g. connected in series with a resistor R1.

VCC may denote a bias voltage with respect to a reference node NO. The symbol N1 may denote a common node of the photodiode D1A and the resistor R1. The node N1 may provide an electrical output signal VOUT e.g. with respect to the reference node NO and/or with respect to the bias voltage VCC.

Figure 4:
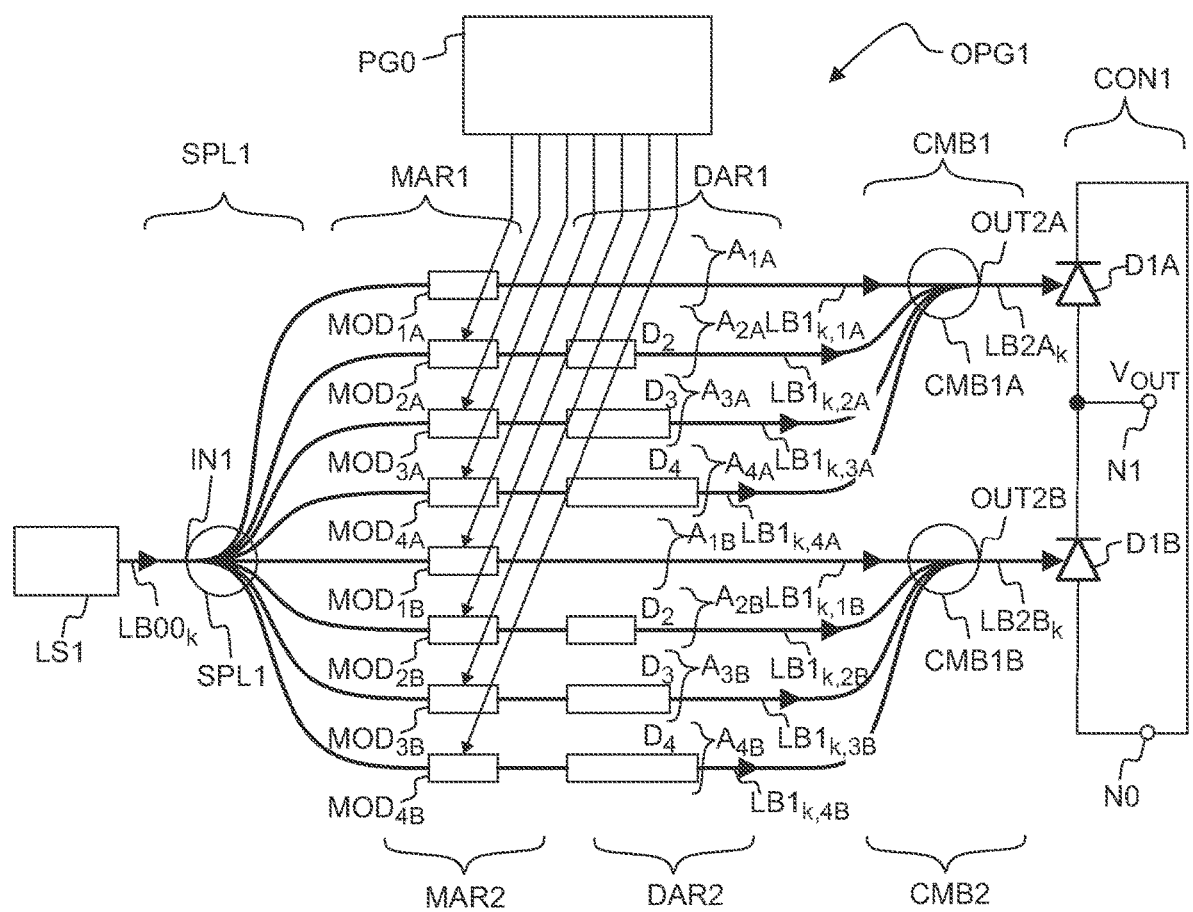
FIG. 4 shows, by way of example, converting an optical output signal into an electrical output signal

Referring to FIG. 4, the device OPG1 may optionally comprise a first set of branches $A_{1A}$, $A_{2A}$, $A_{3A}$, $A_{4A}$, and a second set of branches $A_{1B}$, $A_{2B}$, $A_{3B}$, $A_{4B}$. The modulated signals of the first set may be combined at a first combiner CMB1A. The first combiner CMB may provide a first output signal LB2A from a first output OUT2A. The modulated signals of the second set may be combined at a second combiner CMB1B. The second combiner CMB1B may provide a second output signal LB2B from a second output OUT2A. A primary laser pulse $LB00_k$ may be distributed to the first set and to the second set. Consequently, the second output signal LB2B may be accurately synchronized with the first output signal LB2A. The first optical output signal LB2A and the second optical output signal LB2B may be used e.g. for driving two photodiodes D1A, D1B.

The photodiodes D1A, D1B may be e.g. connected anti-parallel to provide an alternating voltage signal VOUT at a high frequency ($M \cdot f_0$).

Figure 5A:
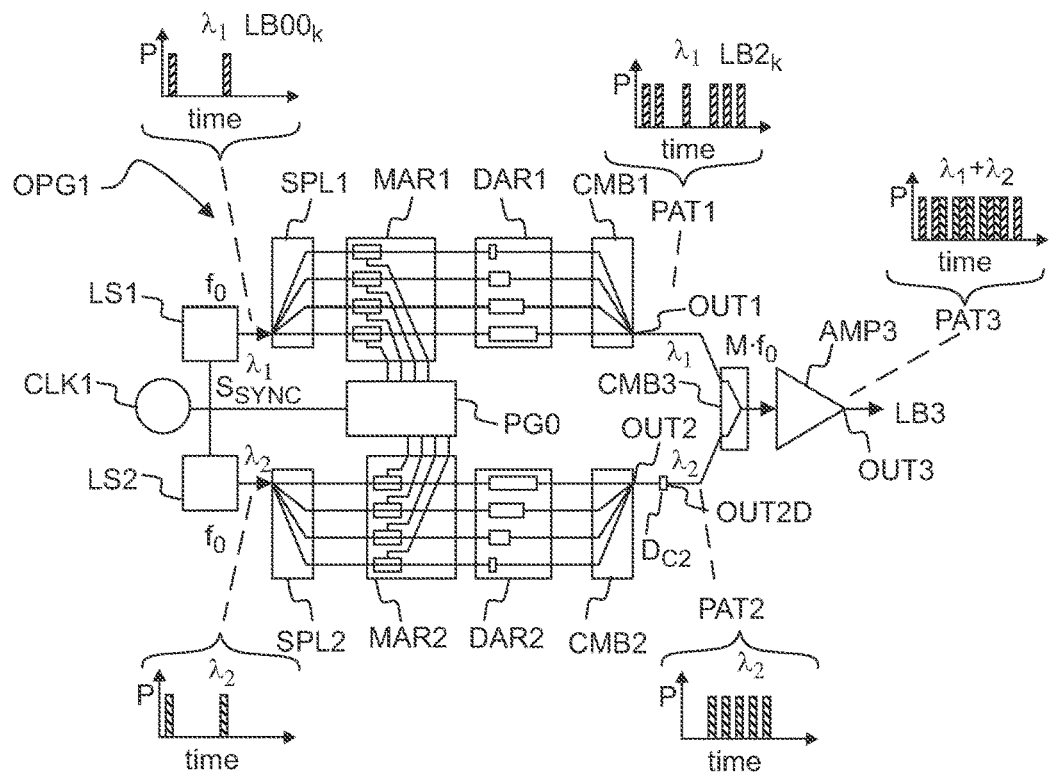
FIG. 5a shows, by way of example, an optical pattern generator device arranged to provide several pulse patterns at different wavelengths.

Referring to FIG. 5a, the optical pattern generator device OPG1 may comprise a first light source LS1 to provide first laser pulses at a first wavelength $\lambda_1$, and the optical pattern generator device OPG1 may comprise a second light source LS2 to provide second laser pulses at a second different wavelength $\lambda_2$. The device OPG1 may comprise one or more splitters SPL1, a first modulator array MAR1, and a first delay array DAR1 to form a plurality first modulated delayed signals LB1 from the first laser pulses at the first wavelength $\lambda_1$. The device OPG1 may comprise one or more splitters SPL2, a second modulator array MAR2 and a second delay array DAR2 to form a plurality second modulated delayed signals LB1 at the second wavelength $\lambda_2$. The device OPG1 may comprise one or more combiners CMB1, CMB2, CMB3 to form a combined output signal (LB2) by combining the modulated delayed signals (LB1). The device OPG1 may comprise an optical amplifier AMP3 to provide an amplified optical signal LB3 by optically amplifying the combined signal (LB2).

The output signal (LB2) may comprise a first pulse pattern PAT1 formed of pulses of the first wavelength $\lambda_1$, and the output signal (LB2) may comprise a second pulse pattern PAT2 formed of pulses of the second wavelength $\lambda_2$.

The device OPG1 may be arranged to provide the first pulse pattern PAT1 and the second pulse pattern PAT2 so that the arrival times of pulses of the first pulse pattern PAT1 are interlaced with the arrival times of pulses of the second pulse pattern PAT2 at the input of the optical amplifier AMP3. The propagation delays of the different branches of the device OPG1 may be selected such that the pulses of the first pulse pattern PAT1 may be interlaced with the pulses of the second pulse pattern PAT2. The device OPG1 may optionally comprise an optical delay element $D_{C2}$ to delay the second pulse pattern PAT2 with respect to the first pulse pattern PAT1, so as to interlace the arrival times of the pulses.

The device OPG1 may be arranged to provide an uninterrupted stream of optical pulses to the input of the optical amplifier, e.g. in order to stabilize the operation of the optical amplifier AMP3.

Figure 6A:
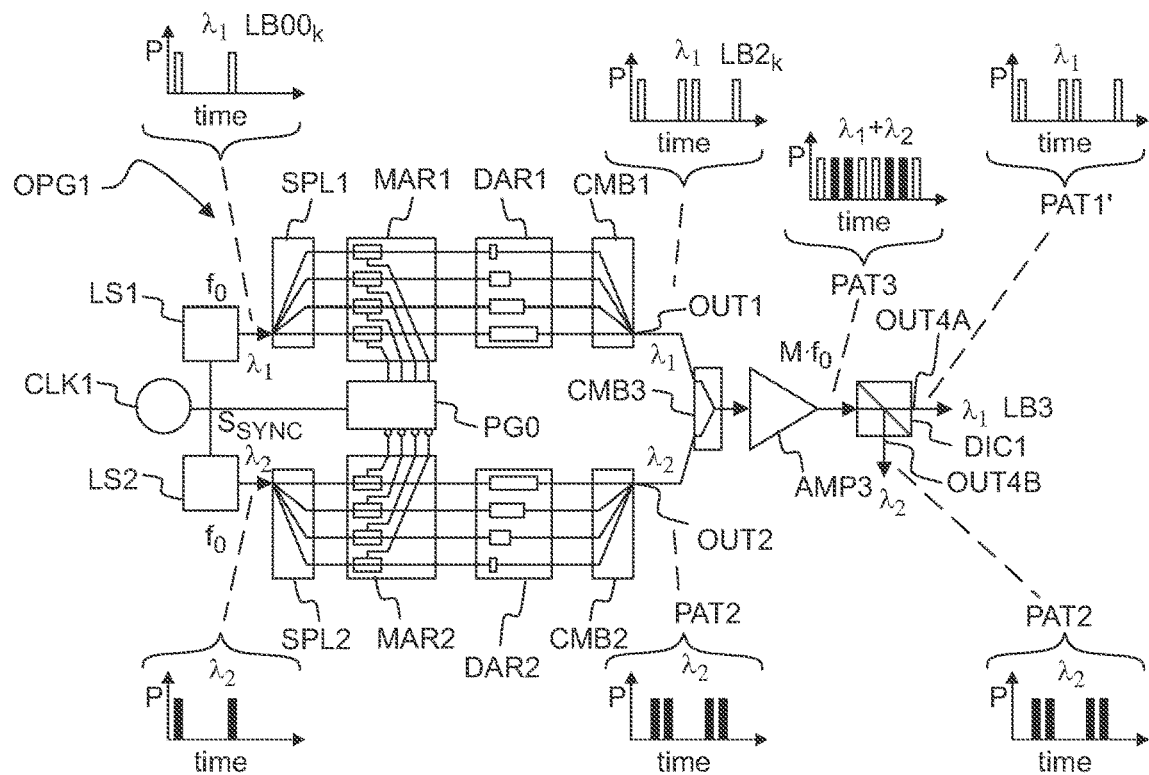
FIG. 6a shows, by way of example, an optical pattern generator device arranged to amplify an uninterrupted stream of pulses of different wavelengths.

The first amplified pulse pattern PAT1 may be optionally separated from the amplified output signal by a spectrally separating component (FIG. 6a).

Figure 5B:
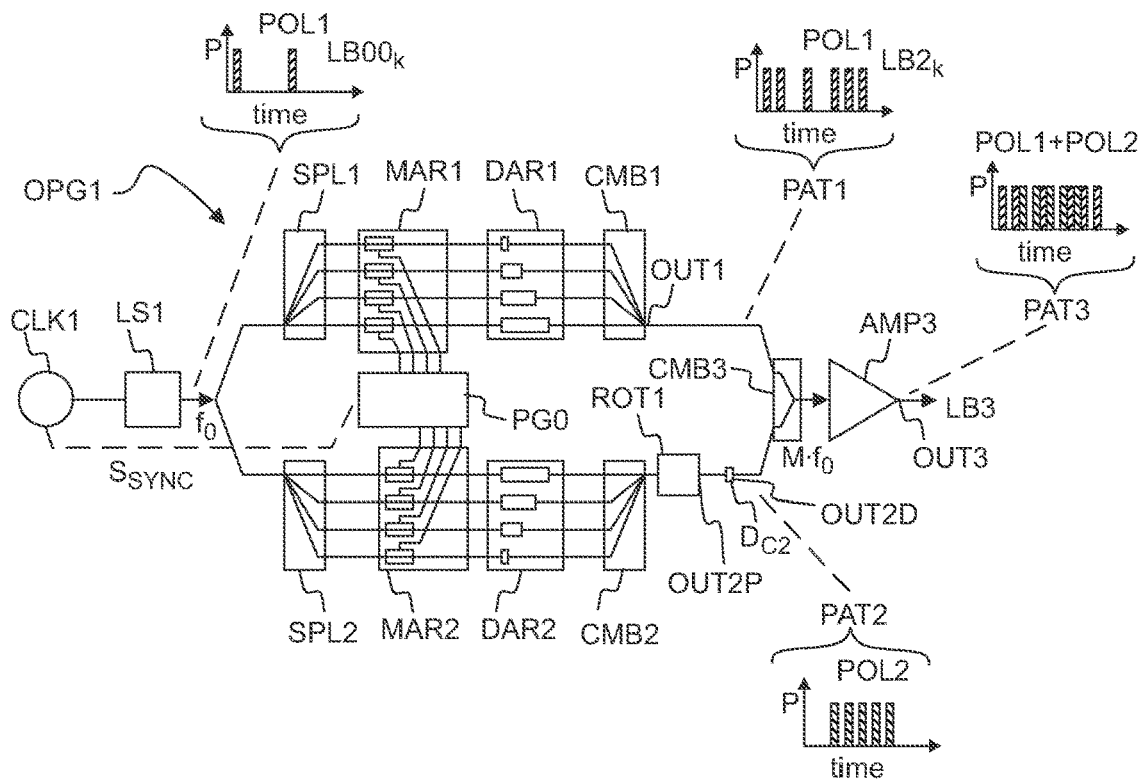
FIG. 5b shows, by way of example, an optical pattern generator device arranged to provide a first pulse pattern having a first polarization state, and a second pulse pattern having a second orthogonal polarization state.

Referring to FIG. 5b, the device OPG1 may comprise a polarization rotating component ROT1 to change the polarization state of optical pulses.

The device OPG1 may comprise one or more splitters SPL1, a first modulator array MAR1 and a first delay array DAR1 to form a plurality first modulated delayed signals LB1 from the laser pulses. The first modulated delayed signals LB1 may have a first polarization state POL1. The device OPG1 may comprise one or more splitters SPL2, a second modulator array MAR2 and a second delay array DAR2 to form a plurality second modulated delayed signals LB1 at the second wavelength $\lambda_2$. The second modulated delayed signals LB1 may be combined to form a second pulse pattern PAT2. The polarization rotating component ROT1 may change the polarization state of the pulses such that the pulses of the second pattern PAT2 may have a second polarization state (POL2), which is orthogonal with respect to the first polarization state (POL1).

The first pulse pattern PAT1 and the second pulse pattern PAT2 may be combined to provide a combined signal LB3, which comprises pulses having the first polarization state (POL1) and pulses having the second polarization state (POL2). The pulses of the first pulse pattern PAT1 may be interlaced with the pulses of the second pulse pattern PAT2.

The device OPG1 may be arranged to provide an uninterrupted stream of optical pulses to the input of the optical amplifier, e.g. in order to stabilize the operation of the optical amplifier AMP3.

The device (OPG1) may be arranged to amplify an uninterrupted stream of pulses by an optical amplifier (AMP3), wherein the uninterrupted stream of pulses comprises pulses of different wavelengths ($\lambda_1,\lambda_2$) and/or pulses of a different polarization states (POL1, POL2).

The device (OPG1) may be arranged to combine pulses of different wavelengths ($\lambda_1,\lambda_2$) and/or to combine pulses of a different polarization states (POL1, POL2), so as to form an output signal (LB2, LB3), which comprises pulses of different wavelengths ($\lambda_1,\lambda_2$) and/or pulses of different polarization states (POL1, POL2).

Figure 6B:
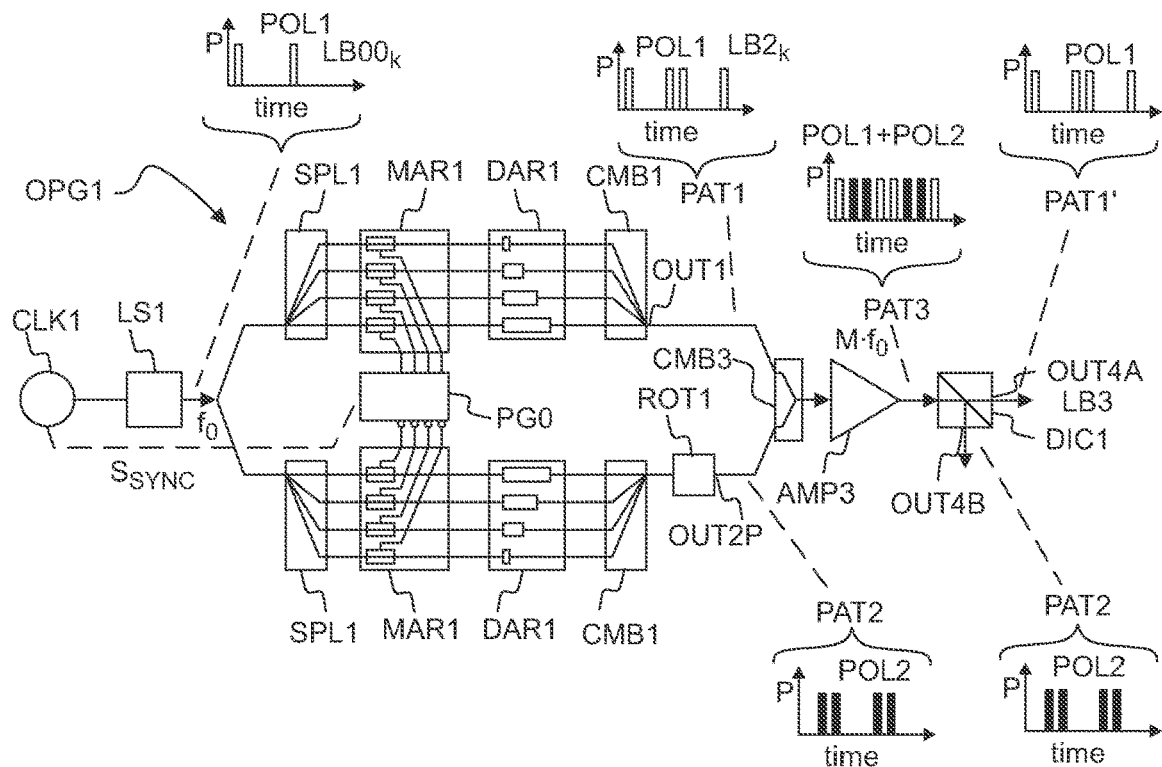
FIG. 6b shows, by way of example, an optical pattern generator device arranged to amplify an uninterrupted stream of pulses having different orthogonal polarization states.

The first amplified pulse pattern PAT1 may be optionally separated from the amplified output signal by a polarization selective component (FIG. 6b).

The device OPG1 may comprise a separating unit (DIC1) to selectively separate a pulse pattern (PAT1) from the output signal (LB2, LB3), the separating unit (DIC1) being a wavelength-selective unit and/or a polarization selective unit.

Referring to FIG. 6a, the first amplified pulse pattern PAT1 may be optionally separated from the amplified output signal by a spectrally separating component DIC1. The component DIC1 may have a first output OUT4A for the first pattern PAT1 at the first wavelength $\lambda_1$. The component DIC1 may optionally have a second output OUT4B for the second pattern PAT2 at the second wavelength $\lambda_2$.

Referring to FIG. 6b, the first amplified pulse pattern PAT1 may be optionally separated from the amplified output signal by a polarization-selective component DIC1. The component DIC1 may have a first output OUT4A for the first pattern PAT1, which has the first polarization state POL1. The component DIC1 may optionally have a second output OUT4B for the second pattern PAT2, which has the second polarization state POL2.

Figure 6C:
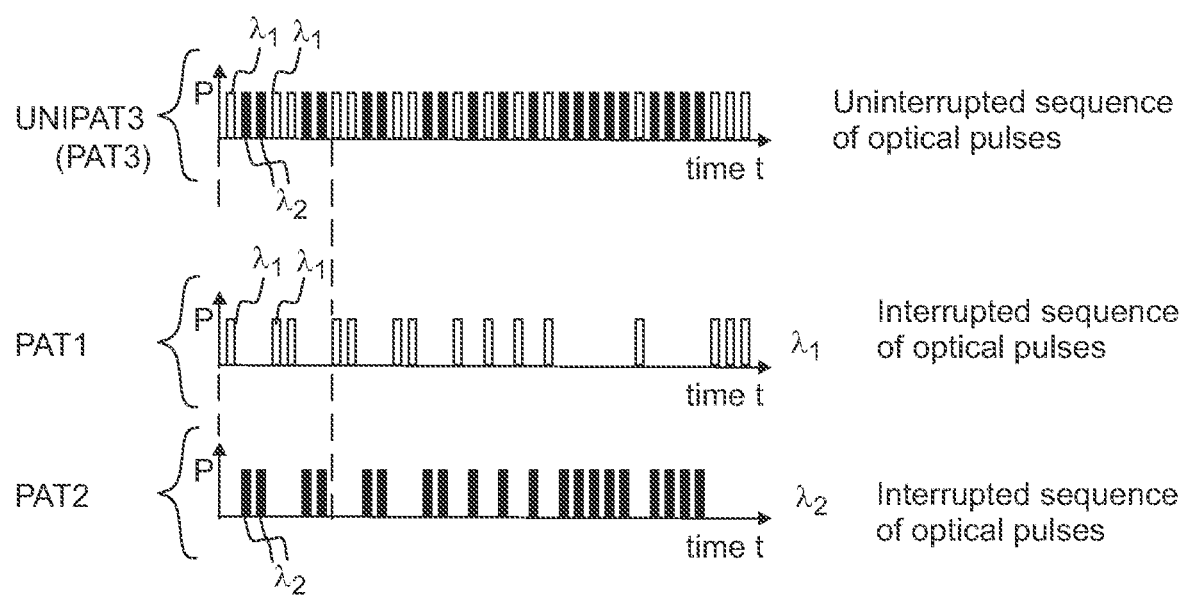
FIG. 6c shows, by way of example, an uninterrupted stream of pulses, wherein the uninterrupted stream of pulses is formed of a first interrupted stream and a second interrupted stream.

Referring to FIG. 6c, the device OPG1 may be arranged to provide an uninterrupted stream UNIPAT3 of optical pulses to an input of an optical amplifier, e.g. in order to stabilize the operation of the optical amplifier. The stream of pulses may also be called e.g. as a sequence or pattern of pulses. The optical pulses of the uninterrupted stream UNIPAT3 may have substantially equal energy. The uninterrupted stream UNIPAT3 may comprise a first optical pulse pattern OPAT1 at a first wavelength $\lambda_1$, and a second optical pulse pattern OPAT2 at a second wavelength $\lambda_2$. The uninterrupted stream UNIPAT3 may comprise a first optical pulse pattern OPAT1 formed of pulses which have a first polarization state (POL1), and a second optical pulse pattern OPAT2 formed of pulses which have a second orthogonal polarization state (POL2).

The uninterrupted stream UNIPAT3 may comprise a first interrupted stream (OPAT1) of optical pulses, and a second interrupted stream (OPAT1) of optical pulses. An interrupted stream has missing pulses, i.e. the time period between some consecutive pulses may be substantially greater than the average time period between consecutive pulses. An uninterrupted stream does not have missing pulses. The time period between consecutive pulses of the uninterrupted stream may be substantially constant.

The uninterrupted stream UNIPAT3 may also comprise three or more optical pulse patterns at different wavelengths ($\lambda_1$, $\lambda_2$, $\lambda_3$), wherein at least two optical pulse patterns are interrupted.

The spectral separation between adjacent wavelengths $\lambda_1$, $\lambda_2$ may be e.g. greater than 0.1 nm.

In an embodiment, a first uninterrupted optical pulse sequence (UNIPAT1) having a first wavelength $\lambda_1$, and a second uninterrupted optical pulse sequence (UNIPAT1) having a second different wavelength $\lambda_2$ may be arranged to simultaneously propagate along a branch (e.g. A1) of the device OPG1 to the modulator (MOD1). The modulator (MOD1) may be Mach-Zehnder (type) modulator, which may allow a pulse of the first wavelength $\lambda_1$ or a pulse of a second wavelength $\lambda_2$ to pass via the modulator (MOD1), depending on the state of the modulator. Consequently, the modulator (MOD1) may form a third uninterrupted optical pulse sequence (UNIPAT1) from the pulses of the first wavelength $\lambda_1$ and from the pulses of the second wavelength $\lambda_2$. The optical pulses of the third uninterrupted optical pulse sequence may be optionally guided to an optical amplifier to amplify the pulses.

A first uninterrupted optical pulse sequence (UNIPAT1) having a first wavelength $\lambda_1$, and a second uninterrupted optical pulse sequence (UNIPAT1) having a second different wavelength $\lambda_2$ may be arranged to simultaneously propagate along each branch (A, A2, A3, A41) of the device OPG1 to the modulators (MOD1), so as to provide uninterrupted modulated optical pulse sequences (UNIPAT1) from each branch (A, A2, A3, A41) of the device OPG1.

Figure 7A:
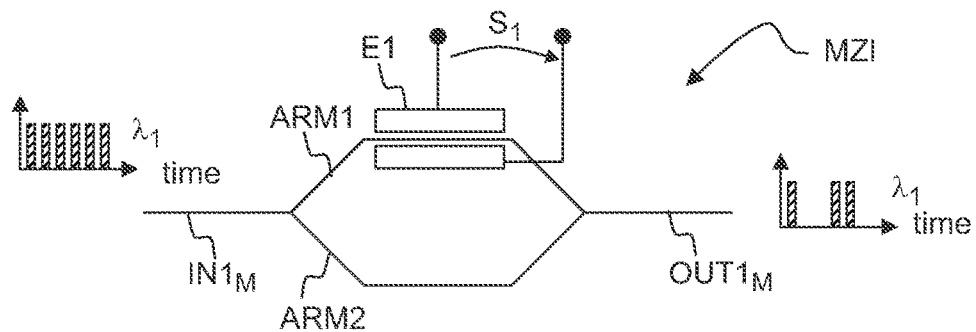
FIG. 7a shows, by way of example, forming a modulated signal from pulses by using a Mach-Zender interferometer.

Referring to FIG. 7a, a Mach-Zehnder modulator MZI (e.g. MOD1) may have a first input $IN1_M$ to receive optical pulses at a first wavelength $\lambda_1$, and a first output $OUT1_M$ to provide a modulated signal, which comprises pulses at the first wavelength $\lambda_1$.

The Mach-Zehnder modulator MZI comprises a first arm ARM1 and a second ARM2. At least one of the arms ARM1, ARM2 may comprise a modulating element E1. A control signal S1 may be applied to the modulating element E1, so as to set the state of the Mach-Zehnder modulator MZI from the passing state to the blocking state and/or from the blocking state to the passing state, for pulses at the first wavelength $\lambda_1$.

Figure 7B:
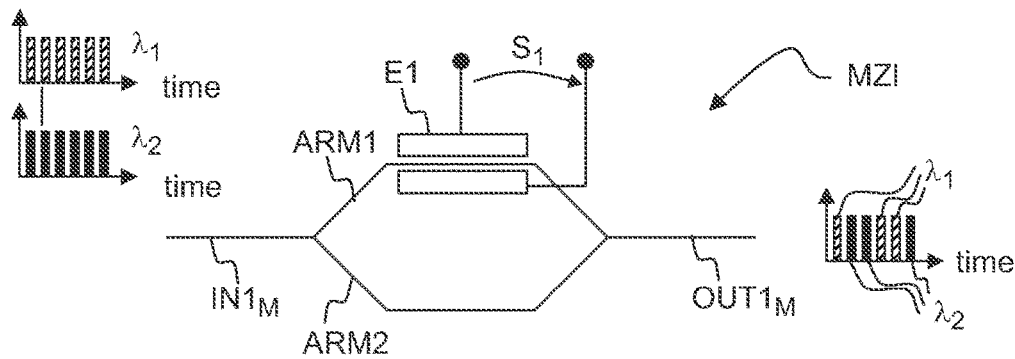
FIG. 7b shows, by way of example, forming a modulated signal from pulses of two different wavelengths by using a Mach-Zender interferometer.

Referring to FIG. 7b, the first input $IN1_M$ may receive first pulses, which have the first wavelength $\lambda_1$, and second pulses, which have the second wavelength $\lambda_1$. The Mach-Zehnder modulator MZI may be arranged to allow either the first pulses or the second pulses to pass to the first output $OUT1_M$. The Mach-Zehnder modulator MZI may be arranged to provide an uninterrupted stream of pulses from the first pulses and from the second pulses.

Figure 7C:
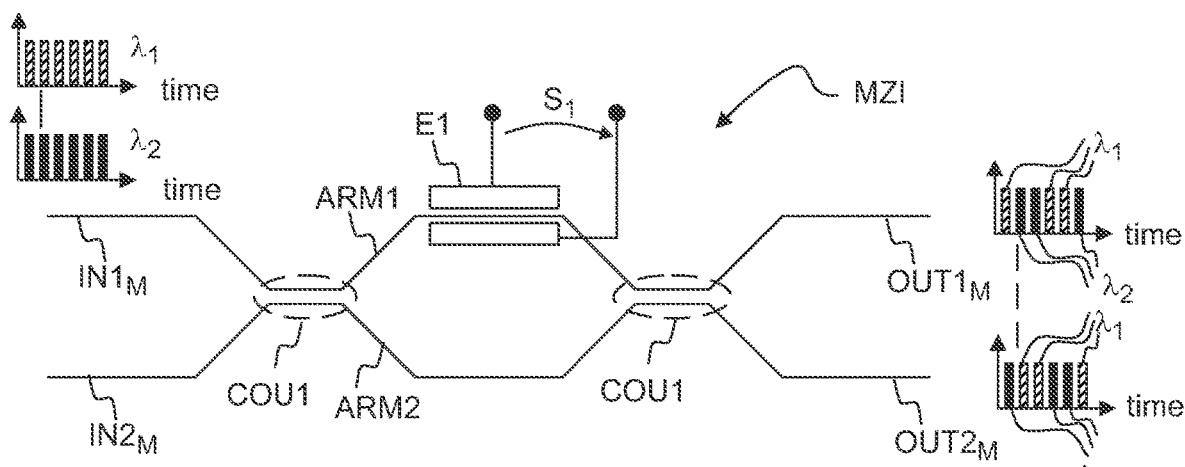
FIG. 7c shows, by way of example, forming a first modulated signal and a second complementary signal by using a Mach-Zender interferometer.

Referring to FIG. 7c, the Mach-Zehnder modulator MZI may comprise a first input IN1 to receive the first pulses at the first wavelength $\lambda_1$, and to receive the second pulses at the second wavelength $\lambda_2$. The Mach-Zehnder modulator MZI may be arranged to allow either the first pulses or the second pulses to pass to the first output $OUT1_M$, depending on the state of the Mach-Zehnder modulator MZI. The Mach-Zehnder modulator MZI may be arranged to provide an uninterrupted stream of pulses from the first pulses and from the second pulses.

The Mach-Zehnder modulator MZI may comprise a second output $OUT2_M$ to provide a complementary pulse pattern, which comprises the first pulses and the second pulses. The second output $OUT2_M$ may provide a second output signal, which is complementary with respect to the first output signal provided by the first output $OUT1_M$.

The symbol COU1 may denote the optical couplers to the Mach-Zehnder modulator MZI. $IN2_M$ may denote a second input of the Mach-Zehnder modulator MZI.

Figure 8A:
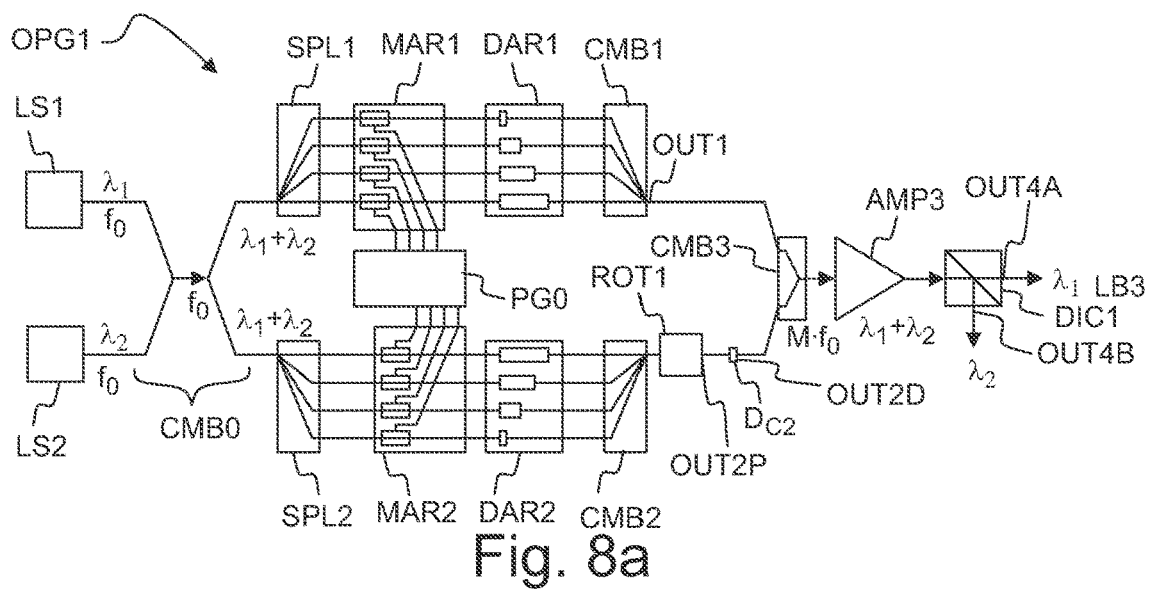
FIG. 8a shows, by way of example, an optical pattern generator device arranged to provide a pulse pattern, which comprises pulses of two different polarization states.
Figure 8B:
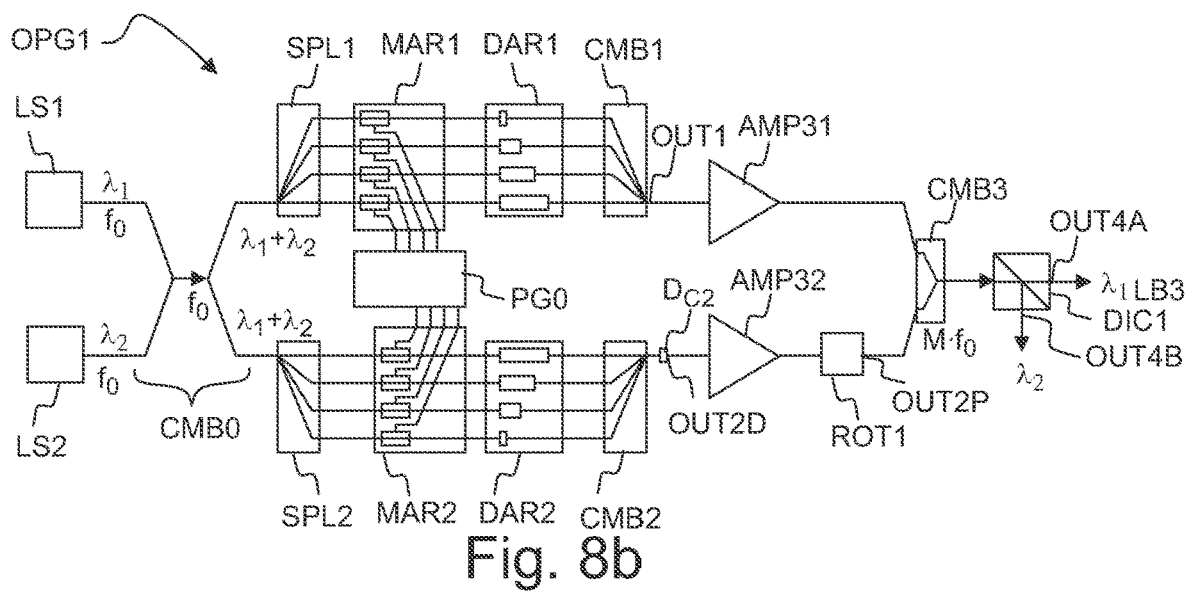
FIG. 8b shows, by way of example, an optical pattern generator device arranged to provide a pulse pattern, which comprises pulses of two different polarization states.

Referring to FIG. 8a, each modulator may be arranged to receive pulses at the first wavelength $\lambda_1$ and at the second wavelength $\lambda_2$. Consequently, each arm of the device OPG1 may provide an uninterrupted stream of pulses at the wavelengths $\lambda_1, \lambda_2$.

The device OPG1 may comprise a polarization rotating component ROT1 to change the polarization state of signals modulated by the second modulator array MAR2.

The device OPG1 may provide an uninterrupted stream of interlaced pulses, which have different wavelength $\lambda_1, \lambda_2$ and/or different orthogonal polarization state (POL1, POL2).

The pulses may be optionally amplified by an optical amplifier AMP3.

The device OPG1 may comprise a separating unit DIC1 to separate a first pulse pattern PAT1 from the combined optical signal. The separating unit DIC1 may be a wavelength-selective unit or a polarization selective unit.

Referring to FIG. 8d, the device OPG1 may optionally comprise a first optical amplifier (AMP31) to amplify pulses which have a first polarization state (POL1), and a second optical amplifier (AMP32) to amplify pulses which have a second different polarization state (POL2).

Figure 9:
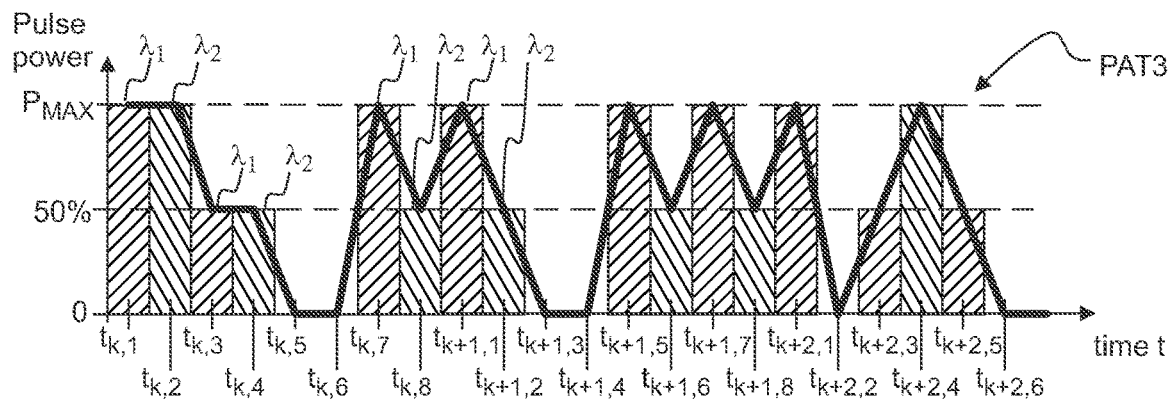
FIG. 9 shows, by way of example, a produced pulse pattern which comprises multi-level pulses.

Referring to FIG. 9, the device OPG1 may be arranged to provide multi-level optical pulses. The modulators (MOD1, MOD2, MOD3, MOD4) may also be arranged to provide other levels than the existing pulse (logical level one) and the missing pulse (logical level zero). For example, each modulator may have three or more states to provide one or more intermediate signal levels in addition to the zero level (0) and the full level (1). For example, each modulator may be arranged to provide a half level optical pulse (50%) in addition to the missing (blocked) pulse and the full level pulse (100%).

The optical pattern generator device OPG1 may also be arranged to provide an optical signal LB2,LB3 which comprises two or more optical pulse patterns PAT1, PAT2 at different wavelengths $\lambda_1, \lambda_2$. The optical pulse patterns PAT1, PAT2 may also be interlaced so as to provide a substantially continuous envelope for the produced optical waveform.

Forming the optical signal LB2, LB3 from pulses of two or more different wavelengths $\lambda_1, \lambda_2$ may help to avoid disturbing interference effects when consecutive pulses partly overlap with each other. The device OPG1 may be arranged to operate such that consecutive pulses of the output signal have different wavelengths $\lambda_1, \lambda_2$.

Forming the optical signal LB2, LB3 from pulses of different polarization states (POL1, POL2) may help to avoid disturbing interference effects when consecutive pulses partly overlap with each other. The device OPG1 may be arranged to operate such that consecutive pulses of the output signal have different polarization states (POL1, POL2). The output signal LB2, LB3 may comprise a first pulse and a second pulse, the first pulse may partly overlap the second pulse, the first pulse may have a first polarization state POL1, and the second pulse may have a second polarization state POL2, which is orthogonal with respect to the first polarization state.

The device (OPG1) may be arranged to form an output signal (LB2, LB3), which comprises pulses of different wavelengths ($\lambda_1,\lambda_2$) and/or pulses of different polarization states (POL1, POL2), wherein said output signal (LB2, LB3) comprises consecutive pulses which are partly overlapping with each other.

Figure 10:
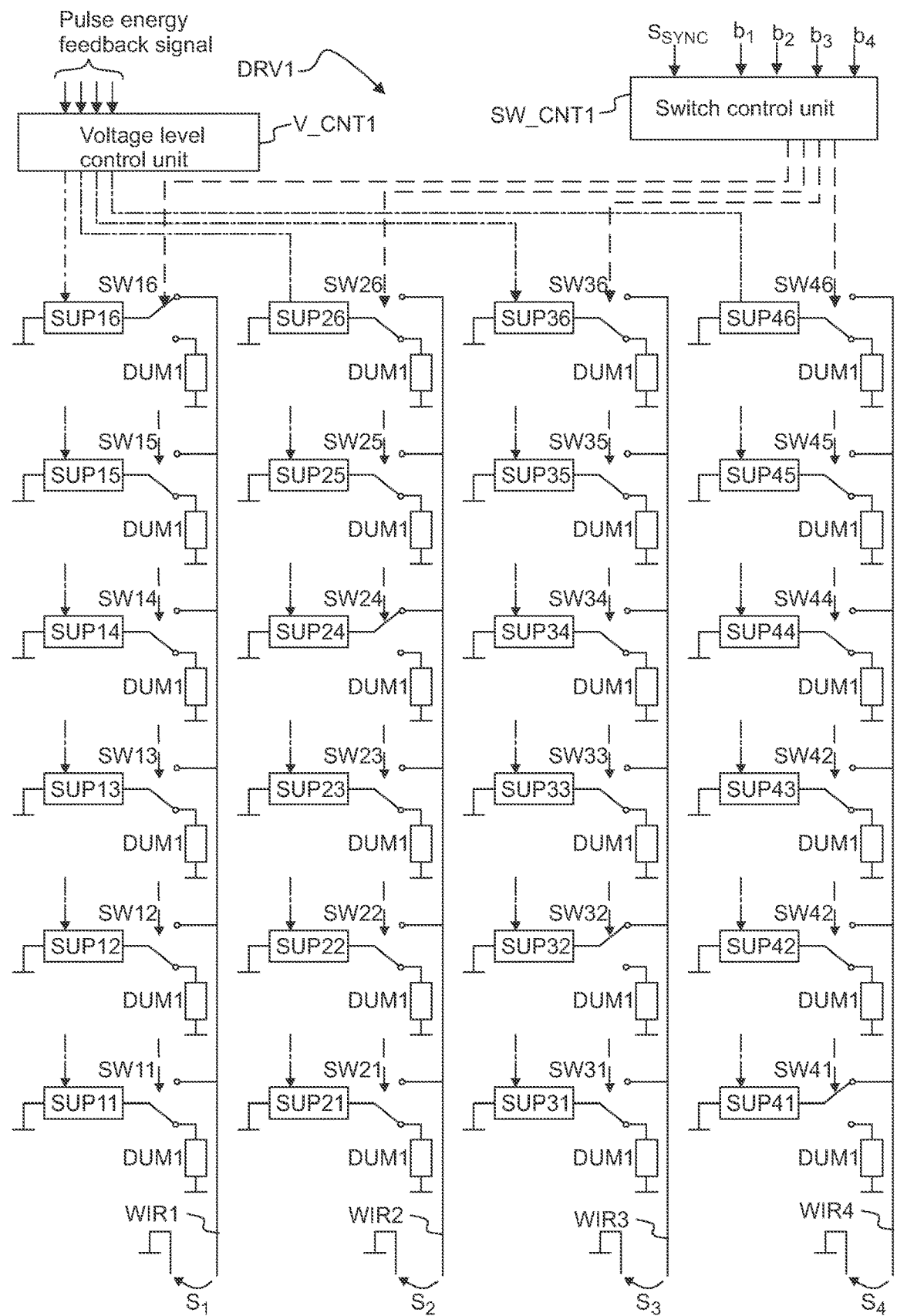
FIG. 10 shows, by way of example, a driving unit of the optical pattern generator device.

Referring to FIG. 10, the driving unit DRV1 of the generator device OPG1 may comprise e.g. a plurality of voltage supplies SUP11, SUP12, SUP46 to provide control voltages for the modulators MOD1, MOD2, MOD3, MOD4. The voltage supplies SUP11, SUP12, SUP46 may be e.g. low noise voltage supplies.

The number of the different control voltage levels provided by the driving unit DRV1 may greater than or equal to 2.

The driving unit DRV1 may comprise two or more voltage supplies SUP11, SUP12 to provide two different control voltage levels for each modulator, for setting the modulator to the pass state or to the blocking state.

The driving unit DRV1 may also comprise three or more voltage supplies SUP11, SUP12 to provide three or more control voltage levels for each modulator, for forming multi-level optical pulses.

The number of the different voltage levels may e.g. greater than or equal to 3. FIG. 10 shows a driving unit DRV1 for providing 6 voltage levels for 4 modulators.

The driving unit DRV1 may comprise a first array of switches SW11, SW12, . . . SW16 to connect a first output of the driving unit DRV1 to one of the voltage supplies SUP11, SUP12, SUP13, SUP14, SUP15, SUP16. The switches SW11, SW12, SW13, SW14, SW16, SW16 may be connected to the first output via a first conductor WIR1, so as to provide a first control voltage S1 for a first modulator MOD1. The first control voltage S1 may be applied via the conductor WIR1 to a control input of the first modulator MOD1.

The switches SW11, SW12, SW13, SW14, SW15, SW16 may be arranged to galvanically connect one voltage supply SUP11, SUP12, SUP13, SUP14, SUP15, SUP16 at a time to the first modulator (MOD1).

The driving unit DRV1 may comprise a second array of switches SW21, SW22, . . . SW26 to connect a second output of the driving unit DRV1 to one of the voltage supplies SUP21, SUP22, SUP26. The switches may be connected to the second output via a second conductor WIR2, so as to provide a second control voltage S2 for a second modulator MOD2. The second control voltage S1 may be applied via the conductor WIR2 to a control input of the second modulator MOD2.

The driving unit DRV1 may comprise a third array of switches SW31, SW32, . . . SW36 to connect a third output of the driving unit DRV1 to one of the voltage supplies SUP31, SUP32, SUP36. The switches may be connected to the third output via a third conductor WIR3, so as to provide a third control voltage S3 for a third modulator MOD3. The third control voltage S3 may be applied via the conductor WIR3 to a control input of the third modulator MOD3.

The driving unit DRV1 may comprise fourth array of switches SW41, SW42, . . . SW46 to connect a fourth output of the driving unit DRV1 to one of the voltage supplies SUP41, SUP42, . . . SUP46. The switches may be connected to the fourth output via a fourth conductor WIR4, so as to provide a fourth control voltage S4 for a fourth modulator MOD4. The fourth control voltage S4 may be applied via the conductor WIR4 to a control input of the fourth modulator MOD4.

The switches may be implemented e.g. by transistors. The driving unit DRV1 may comprise a switch control unit to control operation of the switches SW11, SW12, SW46 according to signals $b_1$, $b_2$, $b_3$, $b_4$, which indicate the values of the primary pattern PAT0. The driving unit DRV1 may form the control signals S1, S2, S3, S4 for the modulators MOD1, MOD2, MOD3, MOD4 according to the signals $b_1$, $b_2$, $b_3$, $b_4$, wherein the produced optical pulse pattern OPAT1 may correspond to the primary pattern PAT0.

Connecting the control voltage output to the voltage supplies by the switches may provide highly stable control voltages for a modulator.

In an embodiment, driving unit DRV1 may optionally comprise a plurality of dummy loads DUM1 to provide substantially constant load for each voltage supply SUP11 . . . SUP46. The switches SW11, SW12, SW46 may connect each voltage supply SUP11 . . . SUP46 either to a dummy load 46 or to a modulator MOD1, MOD2, MOD3, MOD4, so as to stabilize operation of the voltage supplies SUP11 . . . SUP46.

In an embodiment, the voltage supplies SUP11 . . . SUP46 may be adjustable and/or controllable. The generator device OPG1 may optionally comprise a control unit V_CNT1 for controlling voltage levels of the voltage supplies SUP11 . . . SUP46 based on feedback signals indicative of pulse energy of the modulated pulses, so as to stabilize the operation of the modulators. The driving unit DRV1 may comprise a control unit V_CNT1 for controlling voltage levels of the voltage supplies SUP11 . . . SUP46.

Figure 11:
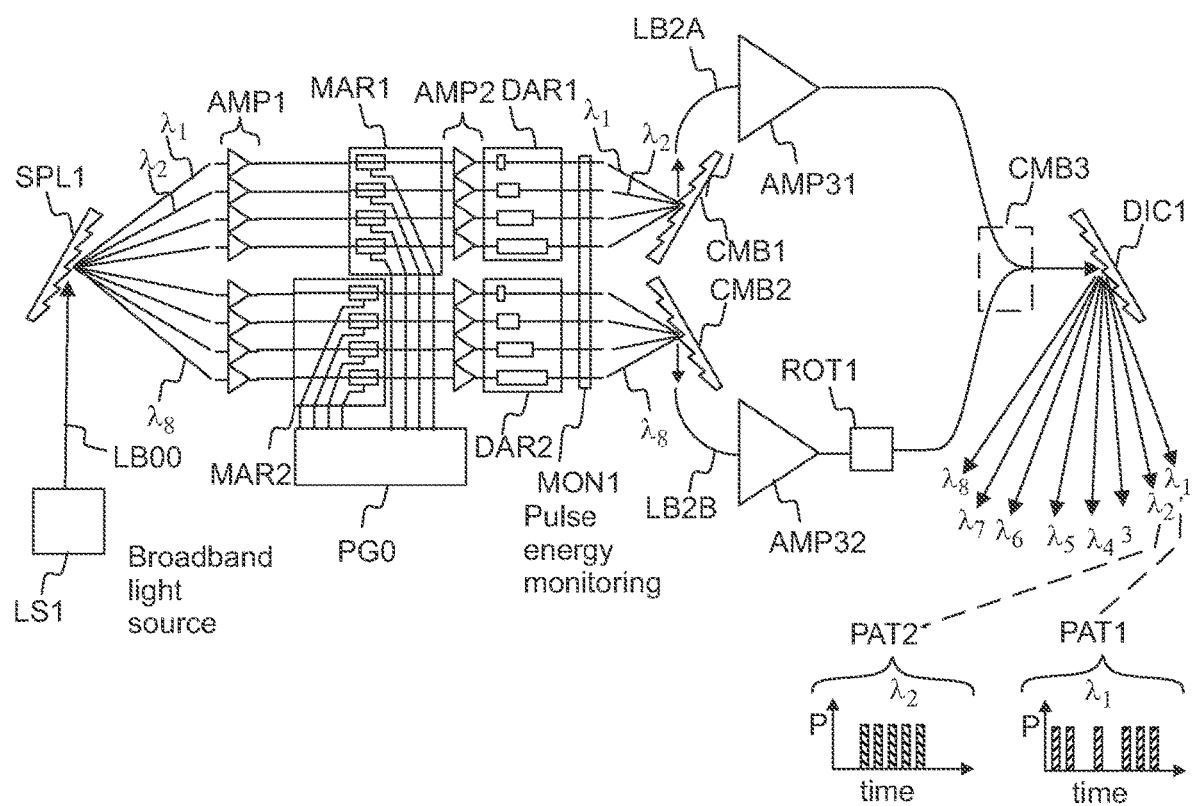
FIG. 11 shows, by way of example, an optical pattern generator device arranged to form optical pulse patterns at multiple different wavelengths.

Referring to FIG. 11, the generator device OPG1 may comprise one or more optical amplifiers AMP1, AMP2, AMP31, AMP32 to optically amplify optical pulses. The optical amplifiers AMP1, AMP2, AMP31, AMP32 may be e.g. semiconductor optical amplifiers and/or fiber amplifiers. The fiber amplifiers may be e.g. erbium doped fiber amplifiers or ytterbium doped fiber amplifiers. One or more optical amplifiers AMP1 may be positioned e.g. between a distributor SPL1 and the modulators (MAR1, MAR2), between the modulators (MAR1, MAR2) and delay lines (DAR1, DAR2), between delay lines (DAR1, DAR2) and a combiner CMB1, and/or after a combiner CMB1. The amplification of one or more optical amplifiers may be adjustable.

The generator device OPG1 may comprise one or more detectors MON1 for monitoring pulse energy of optical pulses. For example, detectors MON1 may be arranged to monitor pulse energy of optical pulses propagating in each branch of the generator device OPG1. The detectors MON1 may be arranged to provide feedback signals indicative of the detected pulse energy. The generator device OPG1 may be arranged to control operation of the driving unit, to control operation of the modulators, and/or to control operation of the amplifiers based on the feedback signals obtained from the detectors MON1, so as to stabilize operation of the generator device OPG1.

In an embodiment, each branch of the generator device OPG1 may comprise an optical pulse energy sensor (MON1), an intensity modulator, and an optical amplifier. The pulse energy sensor (MON1) and an intensity modulator may be separated by a distance that provides sufficient time delay for a feedback signal from the sensor to enable controlling the transmittance of the modulator in the same branch as an optical amplifier so as to effectively reduce or eliminate pulse energy variation. The pulse energy variation may be caused e.g. due to varying time intervals in the pulses.

In an embodiment, the transmittance of an intensity modulator in the same branch as the optical amplifier may be adjusted based on the known response of the amplifier to an optical pulse pattern. The transmittance of the intensity modulator may be (predictively) controlled in advance based on the known shape of the optical pulse pattern and based on the known response of the amplifier to the optical pulse pattern.

The generator device OPG1 may comprise one or more diffractive distributors SPL1 and one or more diffractive combiners to produce several optical pulse patterns at different wavelengths $\lambda_1$, $\lambda_2$, . . . $\lambda_8$. The generator device OPG1 may optionally comprise spectrally selective separating unit DIC1 to separate one or more pulse patterns from an optical signal of the generator device OPG1.

The spectral separation between adjacent different wavelengths $\lambda_1$, $\lambda_2$, . . . $\lambda_8$ may be e.g. greater than 0.1 nm, so as to reduce or avoid interference between overlapping optical pulses.

The generator device OPG1 may optionally comprise a temperature control system to maintain one or more functional units of the generator device at a constant operating temperature.

In an embodiment, the optical output of the generator device may be used for driving a Josephson junction voltage standard. The Josephson junction voltage standard may be positioned in the cryostat. The optical output may be coupled into a cryostat e.g. by using an optical fiber. The optical output may be converted into a high frequency electrical waveform inside the cryostat e.g. by using one or more photodiodes. The operating temperature of the Josephson junction voltage standard may be e.g. smaller than or equal to 4.2 K. Guiding the optical output into the cryostat may cause only a small or negligible effect on the operating temperature of the Josephson junction voltage standard. A voltage calibration apparatus may comprise the generator device and a Josephson junction voltage standard.

In an embodiment, the device may be arranged to operate such that the minimum difference between propagation delays (e.g. d2−d1) of a first branch and another branch may also be substantially smaller than $1/(M \cdot f_0)$. The small difference(s) may allow e.g. causing (small) changes to the pulse repetition frequency of the optical output. The small difference(s) may allow micro-stepping of the temporal positions of the optical pulses of the output.

In an embodiment, the primary laser pulses may have a broad spectral linewidth. The distributor may be a spectral splitter and/or the combiner may be a spectral combiner. The optical pulses propagating in the different branches may have different wavelengths.

In an embodiment, the optical output from the combiner may be amplified by using an optical amplifier. The device OPG1 may comprise an optical amplifier. The optical output may be coupled to the optical amplifier.

In an embodiment, the optical output from the combiner may be converted into supercontinuum radiation. The device OPG1 may comprise a conversion unit for converting the optical output from the combiner into supercontinuum radiation.

In an embodiment, the primary laser pulses LB0° may be supercontinuum laser pulses. The light source LS1 may be e.g. a supercontinuum light source.

According to an embodiment, the generator device OPG1 may be arranged to:
form a first uninterrupted optical pulse sequence, which comprises pulses of different wavelengths,
form a second uninterrupted optical pulse sequence, which comprises pulses of different wavelengths,
rotate polarization of the second uninterrupted optical pulse sequence,
form a combined uninterrupted optical pulse sequence by combining the first uninterrupted optical pulse sequence and the second polarization-rotated uninterrupted optical pulse sequence, and
form a first optical output signal by spectrally separating from the combined uninterrupted optical pulse sequence.

The uninterrupted sequences may be formed e.g. by using Mach-Zehnder modulators.

The optical pulses of the uninterrupted sequences may be optionally amplified at one or more locations. The first uninterrupted optical pulse sequence may be optically amplified before the combining. The second uninterrupted amplified optical pulse sequence may be optically amplified before the combining. The combined uninterrupted optical pulse sequence may be optically amplified after the combining.

The generator device OPG1 may also be arranged to convert the first optical output signal into a first electrical signal.

According to an embodiment, the generator device OPG1 may be arranged to:
form a first uninterrupted amplified optical pulse sequence, which comprises pulses of different wavelengths, and
form a first optical output signal by spectrally separating from the first uninterrupted amplified optical pulse sequence.

The uninterrupted sequence may be formed e.g. by using Mach-Zehnder modulators.

The generator device OPG1 may also be arranged to convert the first optical output signal into a first electrical signal.

According to an embodiment, the generator device OPG1 may be arranged to:
form a first uninterrupted optical pulse sequence, which comprises pulses of different wavelengths,
form a second uninterrupted optical pulse sequence, which comprises pulses of different wavelengths,
form a combined uninterrupted optical pulse sequence by combining the first uninterrupted optical pulse sequence and the second uninterrupted optical pulse sequence,
form a first optical output signal by spectrally separating from the combined uninterrupted optical pulse sequence.

The first and the second uninterrupted sequences may be formed e.g. by using Mach-Zehnder modulators.

The wavelengths of the second uninterrupted optical pulse sequence may be different from the wavelengths of the first uninterrupted optical pulse sequence. The wavelengths of the second uninterrupted optical pulse sequence may be different from the wavelengths of the first uninterrupted optical pulse sequence so as to reduce or avoid interference between overlapping optical pulses. For example, the combined uninterrupted optical pulse sequence may comprise pulses at four or more different wavelengths.

The optical pulses may be optionally amplified at one or more locations. The first uninterrupted optical pulse sequence may be optically amplified before the combining. The second uninterrupted optical pulse sequence may be optically amplified before the combining. The combined uninterrupted optical pulse sequence may be optically amplified after the combining.

The generator device OPG1 may also be arranged to convert the first optical output signal into a first electrical signal.

According to an embodiment, the generator device OPG1 may be arranged to:
form a first uninterrupted optical pulse sequence, which comprises pulses of different wavelengths,
form a first optical output signal by spectrally separating from the first uninterrupted optical pulse sequence,
convert the first optical output signal into a first electrical signal,
form a second uninterrupted optical pulse sequence, which comprises pulses of different wavelengths,
form a second optical output signal by spectrally separating from the second uninterrupted optical pulse sequence,
convert the second optical output signal into a second electrical signal, and
form a combined electrical signal by combining the first electrical signal and the second electrical signal.

The first and the second uninterrupted sequences may be formed e.g. by using Mach-Zehnder modulators.

Various aspects are illustrated by the following examples.

Example 1. An optical pattern generator device (OPG1), comprising:
a light source (LS1) to provide primary laser pulses ($LB00_k$), a distributor (SPL1) to provide a plurality of primary optical pulses ($LB0_{k,1}$, $LB0_{k,2}$, $LB0_{k,3}$) by distributing light of the primary laser pulses ($LB00_k$) into a plurality of branches (A1, A2, A3), a combiner (CMB1) to form an output signal ($LB2_k$) by combining modulated optical signals ($LB1_{k,1}$, $LB1_{k,2}$, $LB1_{k,3}$) from the branches (A1, A2, A3), and a controller unit (PG0) to provide control signals (S1, S2, S3) for controlling optical modulators (MOD1, MOD2, MOD3) of the branches (A1, A2, A3) according to a primary pattern (PAT0), wherein a first branch (A1) comprises a first optical modulator (MOD1) to form a first modulated optical signal ($LB1_{k,1}$) from primary optical pulses ($LB0_{k,1}$) of the first branch (A1), wherein a second branch (A2) comprises a second optical modulator (MOD2) to form a second modulated optical signal ($LB1_{k,2}$) from primary optical pulses ($LB0_{k,2}$) of the second branch (A2), wherein a third branch (A3) comprises a third optical modulator (MOD3) to form a third modulated optical signal ($LB1_{k,3}$) from primary optical pulses ($LB0_{k,3}$) of the third branch (A3), wherein a propagation delay ($d_2$) of the second branch (A2) is different from a propagation delay ($d_1$) of the first branch (A1), and wherein a propagation delay ($d_3$) of the third branch (A3) is different from the propagation delay ($d_1$) of the first branch (A1) and different from the propagation delay ($d_2$) of the second branch (A2).

Example 2. The device (OPG1) of example 1, wherein each modulator (MOD1, MOD2, MOD3) has a pass state which allows propagation of an optical pulse to the combiner (CMB1), and a block state which prevents propagation of an optical pulse to the combiner (CMB1).

Example 3. The device (OPG1) of example 1, wherein the device is arranged to provide multi-level optical pulses.

Example 4. The device (OPG1) according to any of the examples 1 to 3, wherein the modulators (MOD1, MOD2, MOD3) are Mach-Zehnder modulators.

Example 5. The device (OPG1) according to any of the examples 1 to 4, wherein the device (OPG1) is arranged to form an uninterrupted stream (UNIPAT1) of pulses, wherein the uninterrupted stream (UNIPAT1) of pulses comprises pulses of different wavelengths ($\lambda_1, \lambda_2$) and/or pulses of different polarization states (POL1, POL2).

Example 6. The device (OPG1) according to any of the examples 1 to 5, wherein the device (OPG1) comprises an optical amplifier (AMP3) to optically amplify the uninterrupted stream (UNIPAT1).

Example 7. The device (OPG1) according to any of the examples 1 to 6, comprising a plurality of voltage supplies (SUP11, SUP12, SUP13) and a plurality of switches (SW11, SW12, SW13) to provide control signals (S1, S2, S3, S4) for the modulators (MOD1, MOD2, MOD3, MOD4), wherein the switches (SW11, SW12, SW13) are arranged to galvanically connect one voltage supply (SUP11, SUP12, SUP13) at a time to a control input of a first modulator (MOD1) of the first branch (A1).

Example 8. The device (OPG1) according to any of the examples 1 to 7, comprising a plurality of voltage supplies (SUP11, SUP12, SUP13) and a plurality of switches (SW11, SW12, SW13) to provide control signals (S1, S2, S3, S4) for the modulators (MOD1, MOD2, MOD3, MOD4), wherein the device (OPG1) further comprises a plurality of dummy loads (DUM1), wherein the switches (SW11, SW12, SW13) are arranged to connect each voltage supply (SUP11, SUP12, SUP13) either to a dummy load (DUM1) or to a modulator (MOD1, MOD2, MOD3), so as to stabilize operation of the voltage supplies (SUP11, SUP12, SUP13).

Example 9. The device (OPG1) according to any of the examples 1 to 8 wherein a minimum temporal width ($w_s$) of control pulses of the control signals (S1) is greater than a minimum time ($1/(M \cdot f_0)$) between rising edges of consecutive pulses of the output signal ($LB2_k$).

Example 10. The device (OPG1) according to any of the examples 1 to 9 wherein an advance time interval (Tc) between initiating a change of state of modulator (MOD1) of the first branch (A1) and arrival of a primary optical pulse ($LB0_{k,1}$) at the modulator (MOD1) of the first branch (A1) is in the range of 50% to 90% of the time interval ($T_{00}$) between consecutive primary laser pulses ($LB00_k$, $LB00_{k+1}$).

Example 11. The device (OPG1) according to any of the examples 1 to 10, wherein the light source (LS1) provides the primary laser pulses ($LB00_k$) at a first wavelength ($\lambda_1$), and wherein the device (OPG1) comprises a second light source (LS2) to provide second laser pulses ($LB00_k$) at a second different wavelength ($\lambda_2$).

Example 12. The device (OPG1) according to any of the examples 1 to 11, comprising one or more polarization rotating units (ROT1) to change the polarization state (POL1, POL2) of pulses.

Example 13. The device (OPG1) according to any of the examples 1 to 12, wherein the device (OPG1) is arranged to combine pulses of different wavelengths ($\lambda_1, \lambda_2$) and/or to combine pulses of different polarization states (POL1, POL2), so as to form an output signal (LB2, LB3), which comprises pulses of different wavelengths ($\lambda_1, \lambda_2$) and/or pulses of different polarization states (POL1, POL2).

Example 14. The device (OPG1) according to any of the examples 1 to 13, wherein the device (OPG1) is arranged to form an output signal (LB2, LB3), which comprises pulses of different wavelengths ($\lambda_1, \lambda_2$) and/or pulses of different polarization states (POL1, POL2), wherein said output signal (LB2, LB3) comprises consecutive pulses which are partly overlapping with each other.

Example 15. The device (OPG1) according to any of the examples 1 to 14, comprising a separating unit (DIC1) to selectively separate a pulse pattern (PAT1) from the output signal (LB2, LB3), the separating unit (DIC1) being a wavelength-selective unit and/or a polarization selective unit.

Example 16. The device (OPG1) according to any of the examples 1 to 15, comprising one or more detectors (MON1) to monitor energy of optical pulses propagating in branches (A1) of the device (OPG1), and to provide one or more feedback signals indicative of the energy of the optical pulses.

Example 17. The device according to any of the examples 1 to 16, wherein the device is arranged to:
form a first uninterrupted amplified optical pulse sequence, which comprises pulses of different wavelengths, and
form a first optical output signal by spectrally separating from the first uninterrupted amplified optical pulse sequence.

Example 18. The device according to any of the examples 1 to 16, wherein the device is arranged to:
  form a first uninterrupted optical pulse sequence, which comprises pulses of different wavelengths,
  form a second uninterrupted optical pulse sequence, which comprises pulses of different wavelengths,
  form a combined uninterrupted optical pulse sequence by combining the first uninterrupted optical pulse sequence and the second uninterrupted optical pulse sequence,
  form a first optical output signal by spectrally separating from the combined uninterrupted optical pulse sequence.

Example 19. The device according to any of the examples 1 to 16, wherein the device is arranged to:
  form a first uninterrupted optical pulse sequence, which comprises pulses of different wavelengths,
  form a second uninterrupted optical pulse sequence, which comprises pulses of different wavelengths,
  change the polarization state of the second uninterrupted optical pulse sequence to an orthogonal state relative to the first uninterrupted optical pulse sequence,
  form a combined uninterrupted optical pulse sequence by combining the first uninterrupted optical pulse sequence and the second polarization-rotated uninterrupted optical pulse sequence,
  form a first optical output signal by spectrally separating from the combined uninterrupted optical pulse sequence.

Example 20. The device of example 18 or 19, wherein the first and the second uninterrupted optical pulse sequences are optically amplified and/or the combined uninterrupted optical pulse sequence is optically amplified.

Example 21. The device according to any of the examples 18 to 20, comprising forming a second optical output signal by spectrally separating from the combined uninterrupted optical pulse sequence, wherein the second optical output signal is complementary with respect to the first optical output signal.

Example 22. The device according to any of the examples 17 to 21, wherein the device is arranged to convert the first optical output signal into a first electrical signal and/or convert the second optical output signal into a second complementary electrical signal.

Example 23. The device according to any of the examples 1 to 16, wherein the device is arranged to:
  form a first uninterrupted optical pulse sequence,
  form a first optical output signal by spectrally separating from the first uninterrupted optical pulse sequence,
  form a second uninterrupted optical pulse sequence,
  form a second optical output signal by spectrally separating from the first uninterrupted optical pulse sequence, and
  form a combined optical output signal by combining the first optical output signal and the second optical output signal.

Example 24. The device of example 23, wherein the first and the second uninterrupted optical pulse sequences are optically amplified.

Example 25. The device of example 23 or 24, wherein the device is arranged to convert the combined optical output signal into an electrical signal.

Example 26. The device according to any of the examples 1 to 16, wherein the device is arranged to:
  form a first uninterrupted amplified optical pulse sequence,
  form a first optical output signal by spectrally separating from the first uninterrupted amplified optical pulse sequence,
  convert the first optical output signal into a first electrical signal,
  form a second uninterrupted amplified optical pulse sequence,
  form a second optical output signal by spectrally separating from the second uninterrupted amplified optical pulse sequence,
  convert the second optical output signal into a second electrical signal, and
  form a combined electrical signal by combining the first electrical signal and the second electrical signal.

Example 27. The device according to any of the examples 17 to 26, wherein modulators are Mach-Zehnder modulators.

Example 28. The device according to any of the examples 1 to 27, wherein the light source is a broadband light source, preferably a supercontinuum light source.

Example 29. The device according to any of the examples 1 to 28, comprising a cryostat, wherein the device is arranged to convert an optical output signal into an electrical signal in the cryostat.

Example 30. A method, comprising:
  providing primary laser pulses ($LB00_k$),
  providing a plurality of primary optical pulses ($LB0_{k,1}, LB0_{k,2}, LB0_{k,3}$) by distributing light of the primary laser pulses ($LB00_k$) into a plurality of branches (A1, A2, A3),
  forming an output signal ($LB2_k$) by combining modulated optical signals ($LB1_{k,1}, LB1_{k,2}, LB1_{k,3}$) from the branches (A1, A2, A3), and
  providing control signals (S1, S2, S3) for controlling optical modulators (MOD1, MOD2, MOD3) of the branches (A1, A2, A3) according to a primary pattern (PAT0),
  wherein a first branch (A1) comprises a first optical modulator (MOD1) to form a first modulated optical signal ($LB1_{k,1}$) from primary optical pulses ($LB0_{k,1}$) of the first branch (A1),
  wherein a second branch (A2) comprises a second optical modulator (MOD2) to form a second modulated optical signal ($LB1_{k,2}$) from primary optical pulses ($LB0_{k,2}$) of the second branch (A2),
  wherein a third branch (A3) comprises a third optical modulator (MOD3) to form a third modulated optical signal ($LB1_{k,3}$) from primary optical pulses ($LB0_{k,3}$) of the third branch (A3),
  wherein a propagation delay ($d_2$) of the second branch (A2) is different from a propagation delay ($d_1$) of the first branch (A1), and
  wherein a propagation delay ($d_3$) of the third branch (A3) is different from the propagation delay ($d_1$) of the first branch (A1) and different from the propagation delay ($d_2$) of the second branch (A2).

For the person skilled in the art, it will be clear that modifications and variations of the systems, products, devices and methods according to the present invention are perceivable. The figures are schematic. The particular embodiments described above with reference to the accompanying drawings are illustrative only and not meant to limit the scope of the invention, which is defined by the appended claims.

The invention claimed is:

1. An optical pattern generator device, comprising:
a light source to provide primary laser pulses,
a distributor to provide a plurality of primary optical pulses by distributing light of the primary laser pulses into a plurality of branches,
a combiner to form an output signal by combining modulated optical signals from the branches, and
a controller unit to provide control signals for controlling optical modulators of the branches according to a primary pattern,
wherein a first branch comprises a first optical modulator to form a first modulated optical signal from primary optical pulses of the first branch,
wherein a second branch comprises a second optical modulator to form a second modulated optical signal from primary optical pulses of the second branch,
wherein a third branch comprises a third optical modulator to form a third modulated optical signal from primary optical pulses of the third branch,
wherein a propagation delay of the second branch is different from a propagation delay of the first branch, and
wherein a propagation delay of the third branch is different from the propagation delay of the first branch and different from the propagation delay of the second branch;
wherein the device is configured to form an uninterrupted stream of optical return-to-zero pulses such that the time period between consecutive pulses of the uninterrupted stream is substantially constant, such that the optical pulses of the uninterrupted stream have substantially equal energy, and such that the uninterrupted stream of pulses comprises pulses of different wavelengths and/or pulses of different polarization states, and
wherein the device is configured to form the uninterrupted stream from a first interrupted stream of pulses and from a second interrupted stream of pulses.

2. The device of claim 1, wherein each modulator has a pass state which allows propagation of an optical pulse to the combiner, and a block state which prevents propagation of an optical pulse to the combiner.

3. The device of claim 1, wherein the modulators are Mach-Zehnder modulators.

4. The device of claim 1, wherein the device comprises an optical amplifier to optically amplify the uninterrupted stream.

5. The device of claim 1, comprising a plurality of voltage supplies and a plurality of switches to provide control signals for the modulators, wherein the switches are arranged to galvanically connect one voltage supply at a time to a control input of a first modulator of the first branch.

6. The device of claim 1, comprising a plurality of voltage supplies and a plurality of switches to provide control signals for the modulators, wherein the device further comprises a plurality of dummy loads, wherein the switches are arranged to connect each voltage supply either to a dummy load or to a modulator, so as to stabilize operation of the voltage supplies.

7. The device of claim 1, wherein a minimum temporal width of control pulses of the control signals is greater than a minimum time between rising edges of consecutive pulses of the output signal.

8. The device of claim 1, wherein an advance time interval between initiating a change of state of modulator of the first branch and arrival of a primary optical pulse at the modulator of the first branch is in the range of 50% to 90% of the time interval between consecutive primary laser pulses.

9. The device of claim 1, wherein the light source provides the primary laser pulses at a first wavelength, and wherein the device comprises a second light source to provide second laser pulses at a second different wavelength.

10. The device of claim 1, comprising one or more polarization rotating units to change the polarization state of pulses.

11. The device of claim 1, wherein the device is arranged to combine pulses of different wavelengths and/or to combine pulses of different polarization states, so as to form an output signal, which comprises pulses of different wavelengths and/or pulses of different polarization states.

12. The device of claim 1, comprising a separating unit to selectively separate a pulse pattern from the output signal, the separating unit being a wavelength-selective unit and/or a polarization selective unit.

13. The device of claim 1, comprising one or more detectors to monitor energy of optical pulses propagating in branches of the device, and to provide one or more feedback signals indicative of the energy of the optical pulses.

14. The device of claim 1, wherein the device is arranged to:
form a first uninterrupted amplified optical pulse sequence, which comprises pulses of different wavelengths, and
form a first optical output signal by spectrally separating from the first uninterrupted amplified optical pulse sequence.

15. The device of claim 1, wherein the device is arranged to:
form a first uninterrupted optical pulse sequence, which comprises pulses of different wavelengths,
form a second uninterrupted optical pulse sequence, which comprises pulses of different wavelengths,
form a combined uninterrupted optical pulse sequence by combining the first uninterrupted optical pulse sequence and the second uninterrupted optical pulse sequence,
form a first optical output signal by spectrally separating from the combined uninterrupted optical pulse sequence.

16. The device of claim 1, wherein the device is arranged to:
form a first uninterrupted optical pulse sequence, which comprises pulses of different wavelengths,
form a second uninterrupted optical pulse sequence, which comprises pulses of different wavelengths,
change the polarization state of the second uninterrupted optical pulse sequence to an orthogonal state relative to the first uninterrupted optical pulse sequence,
form a combined uninterrupted optical pulse sequence by combining the first uninterrupted optical pulse sequence and the second polarization-rotated uninterrupted optical pulse sequence,
form a first optical output signal by spectrally separating from the combined uninterrupted optical pulse sequence.

17. The device of claim 15, wherein the first and the second uninterrupted optical pulse sequences are optically amplified and/or the combined uninterrupted optical pulse sequence is optically amplified.

18. The device of claim 15, comprising forming a second optical output signal by spectrally separating from the combined uninterrupted optical pulse sequence, wherein the second optical output signal is complementary with respect to the first optical output signal.

19. The device of claim 15, wherein the device is arranged to convert the first optical output signal into a first electrical signal and/or convert the second optical output signal into a second complementary electrical signal.

20. The device of claim 15, wherein modulators are Mach-Zehnder modulators.

21. The device of claim 1, wherein the device is arranged to:
form a first uninterrupted optical pulse sequence,
form a first optical output signal by spectrally separating from the first uninterrupted optical pulse sequence,
form a second uninterrupted optical pulse sequence,
form a second optical output signal by spectrally separating from the first uninterrupted optical pulse sequence, and
form a combined optical output signal by combining the first optical output signal and the second optical output signal.

22. The device of claim 21, wherein the first and the second uninterrupted optical pulse sequences are optically amplified.

23. The device of claim 21, wherein the device is arranged to convert the combined optical output signal into an electrical signal.

24. The device of claim 1, wherein the device is arranged to:
form a first uninterrupted amplified optical pulse sequence,
form a first optical output signal by spectrally separating from the first uninterrupted amplified optical pulse sequence,
convert the first optical output signal into a first electrical signal,
form a second uninterrupted amplified optical pulse sequence,
form a second optical output signal by spectrally separating from the second uninterrupted amplified optical pulse sequence,
convert the second optical output signal into a second electrical signal, and
form a combined electrical signal by combining the first electrical signal and the second electrical signal.

25. The device of claim 1, wherein the light source is a broadband light source or a supercontinuum light source.

26. The device of claim 1, comprising a cryostat, wherein the device is arranged to convert an optical output signal into an electrical signal in the cryostat.

27. A method, comprising:
providing primary laser pulses,
providing a plurality of primary optical pulses by distributing light of the primary laser pulses into a plurality of branches,
forming an output signal by combining modulated optical signals from the branches, and
providing control signals for controlling optical modulators of the branches according to a primary,
wherein a first branch comprises a first optical modulator to form a first modulated optical signal from primary optical pulses of the first branch,
wherein a second branch comprises a second optical modulator to form a second modulated optical signal from primary optical pulses of the second branch,
wherein a third branch comprises a third optical modulator to form a third modulated optical signal from primary optical pulses of the third branch,
wherein a propagation delay of the second branch is different from a propagation delay of the first branch, and
wherein a propagation delay of the third branch is different from the propagation delay of the first branch and different from the propagation delay of the second branch,
wherein the output signal comprises an uninterrupted stream of optical return-to-zero pulses, wherein the uninterrupted stream of pulses comprises pulses of different wavelengths and/or pulses of different polarization states, wherein the time period between consecutive pulses of the uninterrupted stream is substantially constant, wherein the optical pulses of the uninterrupted stream have substantially equal energy, and
wherein the uninterrupted stream is formed from a first interrupted stream of optical pulses and from a second interrupted stream of optical pulses.

* * * * *